(12) United States Patent
Taylor et al.

(10) Patent No.: US 12,515,399 B2
(45) Date of Patent: Jan. 6, 2026

(54) NOZZLES INCLUDING POLYCRYSTALLINE DIAMOND OR POLYCRYSTALLINE CUBIC BORON NITRIDE AND RELATED ASSEMBLIES AND METHODS

(71) Applicant: US Synthetic Corporation, Orem, UT (US)

(72) Inventors: Harris Taylor, Lehi, UT (US); Jacob Crockett, Orem, UT (US); Jarrett Meier, Lehi, UT (US); Scott Schmidt, Draper, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 17/713,170

(22) Filed: Apr. 4, 2022

(65) Prior Publication Data

US 2022/0324168 A1    Oct. 13, 2022

Related U.S. Application Data

(60) Provisional application No. 63/171,708, filed on Apr. 7, 2021.

(51) Int. Cl.
*B29C 64/209* (2017.01)
*B22F 12/53* (2021.01)
(Continued)

(52) U.S. Cl.
CPC .......... *B29C 64/209* (2017.08); *B29C 65/561* (2013.01); *B29C 65/565* (2013.01);
(Continued)

(58) Field of Classification Search
CPC ..... B33Y 30/00; B29C 64/209; B29C 65/561; B29C 65/565; B29C 65/568; B29C 48/02;
(Continued)

(56) References Cited

U.S. PATENT DOCUMENTS 4,426,954 A    1/1984    Keller
5,167,673 A    12/1992   Jones
(Continued)

FOREIGN PATENT DOCUMENTS

CN    107127969 A    9/2017
EP    0833237 A2     4/1998
(Continued)

OTHER PUBLICATIONS

English translation of KR 101776904 (Year: 2017).*
(Continued)

*Primary Examiner* — Galen H Hauth
*Assistant Examiner* — Baileigh Kate Darnell
(74) *Attorney, Agent, or Firm* — BKRIP LLC

(57) ABSTRACT

Embodiments are directed to nozzles for three-dimensional printing and related nozzle assemblies and methods. An example nozzle includes at least one top surface, at least one bottom surface, and at least one nozzle lateral surface extending from or near the top surface to or near the bottom surface. The nozzle also includes at least one conduit surface defining a conduit. At least a portion of the conduit surface comprise at least one of polycrystalline diamond ("PCD"), polycrystalline cubic boron nitride ("PcBN"), or another suitable superhard material. The nozzle may be attached to a base to form a nozzle assembly. The nozzle may be attached to the base by at least one of deforming the base relative to the nozzle, threadedly attaching (either directly or indirectly) the nozzle to the base, or press-fitting a hollow hollowed-sleeve into a passageway defined by the base.

21 Claims, 8 Drawing Sheets

(51) Int. Cl.
*B29C 65/56* (2006.01)
*B33Y 30/00* (2015.01)

(52) U.S. Cl.
CPC ............ *B29C 65/568* (2013.01); *B33Y 30/00* (2014.12); *B29K 2907/02* (2013.01); *B29K 2907/045* (2013.01); *B29K 2909/04* (2013.01); *B29K 2995/0041* (2013.01); *B29K 2995/0094* (2013.01)

(58) Field of Classification Search
CPC ..... B29C 48/25; B29C 48/254; B29C 48/256; B29C 48/30; B29K 2907/045; B29K 2909/04; B29K 2995/0041; B29K 2995/0094; B22F 12/53; B05B 1/00
See application file for complete search history.

(56) References Cited

U.S. PATENT DOCUMENTS

| | | | |
|---|---|---|---|
| 5,363,556 A | 11/1994 | Banholzer | |
| 6,004,124 A * | 12/1999 | Swanson | B29C 48/05 425/375 |
| 7,134,868 B2 | 11/2006 | Babin | |
| 7,172,142 B2 | 2/2007 | Taylor | |
| 8,512,023 B2 | 8/2013 | Judd | |
| 9,463,479 B2 | 10/2016 | Park | |
| 9,808,909 B2 | 11/2017 | Nambiath | |
| 2004/0146598 A1 * | 7/2004 | Sicilia | B29C 45/2806 425/569 |
| 2011/0045124 A1 | 2/2011 | Zuraw | |
| 2016/0236408 A1 * | 8/2016 | Wolf | B29C 64/118 |
| 2017/0355138 A1 * | 12/2017 | Mark | B29C 64/20 |
| 2018/0022027 A1 | 1/2018 | Powell | |
| 2018/0333915 A1 * | 11/2018 | Montgomery | B33Y 10/00 |
| 2019/0022934 A1 | 1/2019 | Kobe | |
| 2019/0091929 A1 | 3/2019 | Harrison | |
| 2019/0375141 A1 * | 12/2019 | Armijo | B29C 48/2566 |
| 2020/0023492 A1 | 1/2020 | Miller | |
| 2020/0031046 A1 * | 1/2020 | Gjovik | B23K 9/167 |
| 2022/0088862 A1 * | 3/2022 | Sagr | B33Y 30/00 |

FOREIGN PATENT DOCUMENTS

| | | |
|---|---|---|
| WO | WO2020239165 A1 | 12/2020 |
| WO | WO-2022047133 A1 * | 3/2022 |

OTHER PUBLICATIONS

English translation of WO 2019/109114 (Year: 2019).*
International Search Report and Written Opinion for PCT/US2022/023363, Jul. 13, 2022, 14 pages.
Williams, "Rubies are a 3D Printer"s Best Friend, Hackaday.com, Nov. 30, 2017, https://hackaday.com/2017/11/30/rubies-are-a-3d-printers-best-friend/.
3D Solex, "S5-UM3 Hardcore Diamond Nozzle", 3dsolex.com, Sep. 27, 2018, https://web.archive.org/web/20180927015623/https://3dsolex.com/product/3dsolex-everlast-diamond-nozzle/.
Carter, "3D Printer Nozzle Abrasion: Discover and understand the mechanisms behind your nozzle wear" Dyzedesign.com, Jun. 7, 2018, https://dyzedesign.com/2018/06/nozzle-abrasion-mechanisms-behind-nozzle-wear/.

* cited by examiner

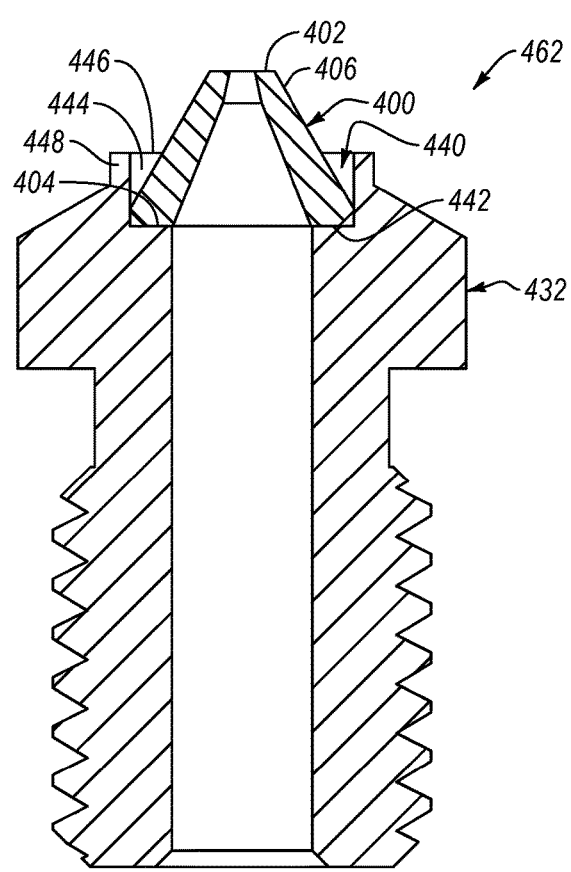
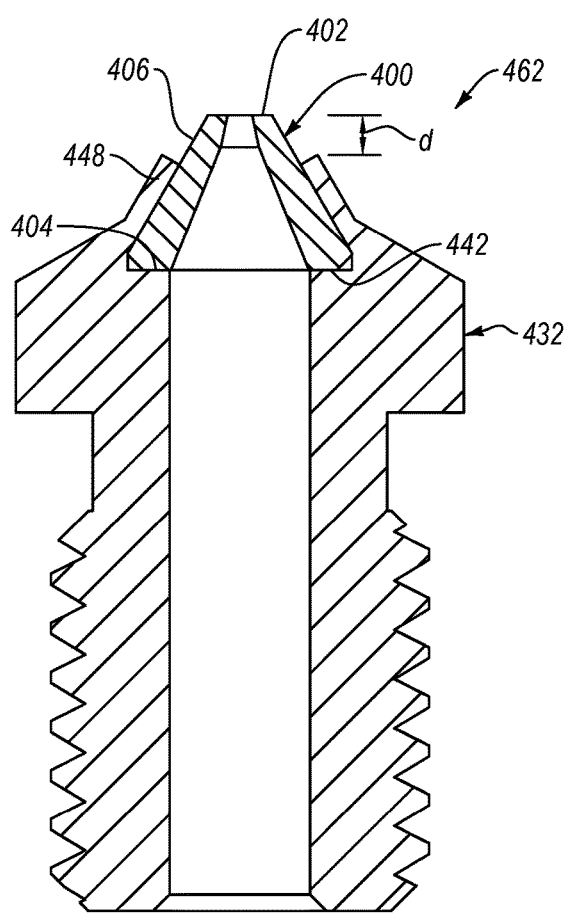
FIG. 4A  FIG. 4B

NOZZLES INCLUDING POLYCRYSTALLINE DIAMOND OR POLYCRYSTALLINE CUBIC BORON NITRIDE AND RELATED ASSEMBLIES AND METHODS

CROSS REFERENCE TO RELATED APPLICATIONS

This application claims the benefit of the filing date of U.S. Provisional Patent Application Ser. No. 63/171,708, titled "NOZZLES INCLUDING POLYCRYSTALLINE DIAMOND OR POLYCRYSTALLINE CUBIC BORON NITRIDE," filed Apr. 7, 2021, the disclosure of which is hereby incorporated by this reference in its entirety.

BACKGROUND

Three-dimensional ("3D") printing is a method that includes dispensing a first layer of material onto a platform from a nozzle. Additionally layers of material may be dispensed from the nozzle onto the first and subsequent layers until a three-dimensional object is formed. However, several issues exist with conventional nozzles and conventional nozzle assemblies that include the nozzles, such as unsatisfactory leaking of the material being dispensed and excessive wear on the nozzles. Thus, new and improved nozzles and nozzle assemblies including such nozzles are desirable.

SUMMARY

In an embodiment, a nozzle assembly for 3D printing is disclosed. The nozzle assembly may include a base defining a recess and a passageway extending from the recess to an exterior of the base. The nozzle assembly may include a nozzle disposed in the recess. The nozzle may include at least one top surface defining an orifice, at least one bottom surface opposite the top surface that defines an opening, at least one lateral surface extending from or near the at least one top surface to or near the at least one bottom surface, and at least one conduit surface defining a conduit. The at least one conduit surface extends from the orifice to the opening. Optionally, at least a portion of the at least one conduit surface comprises at least one of polycrystalline diamond or polycrystalline cubic boron nitride. The conduit of the nozzle is in fluid communication with the passageway when the nozzle is disposed in the recess. The nozzle may be secured to the recess (e.g., by at least one of deforming a portion of the base, threadedly attaching the nozzle to the base, or press-fitting a hollowed-sleeve into the passageway).

In an embodiment, a nozzle for 3D printing is disclosed. The nozzle may include at least one top surface defining an orifice, at least one bottom surface opposite the top surface that defines an opening, at least one lateral surface extending from or near the at least one top surface to or near the at least one bottom surface, and at least one conduit surface defining a conduit. The at least one conduit surface extends from or near the orifice to or near the opening. In some embodiments, at least a portion of the at least one conduit surface comprises at least one of polycrystalline diamond or polycrystalline cubic boron nitride. The nozzle may include at least one protrusion extending from at least one of the at least one bottom surface or the at least one lateral surface.

Some embodiments may include methods of forming and/or using the nozzles and nozzle assemblies.

In an embodiment, a method of attaching a nozzle to a base to form a nozzle assembly for 3D printing is disclosed. The method includes providing the base defining a recess and a passageway extending from the recess to an exterior of the base. The base including at least one wall extending from the rest of the base. The at least one wall defining a portion of the recess. The method also includes disposing the nozzle in the recess. The nozzle includes at least one top surface defining an orifice, at least one bottom surface opposite the top surface that defines an opening, at least one lateral surface, and at least one conduit surface defining a conduit. The at least one conduit surface extends from or near the orifice to or near the opening. In some embodiments, at least a portion of the at least one conduit surface comprises at least one of polycrystalline diamond or polycrystalline cubic boron nitride. The conduit of the nozzle is in fluid communication with the passageway when the nozzle is disposed in the recess. The method further includes deforming the at least one wall. Deforming the at least one wall attaches the nozzle to the base.

In some embodiments, methods of using a nozzle in a three-dimensional printing process may include flowing a fluid (e.g., printing material) through a conduit of a nozzle defined by a conduit surface comprising at least one superhard material where the nozzle is fixedly secured to a base portion.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

FIGS. 4A and 4B are schematic cross-sectional views of a nozzle assembly that includes a nozzle and a base before and after swaging, respectively, according to an embodiment.

DETAILED DESCRIPTION

Figure 1A:
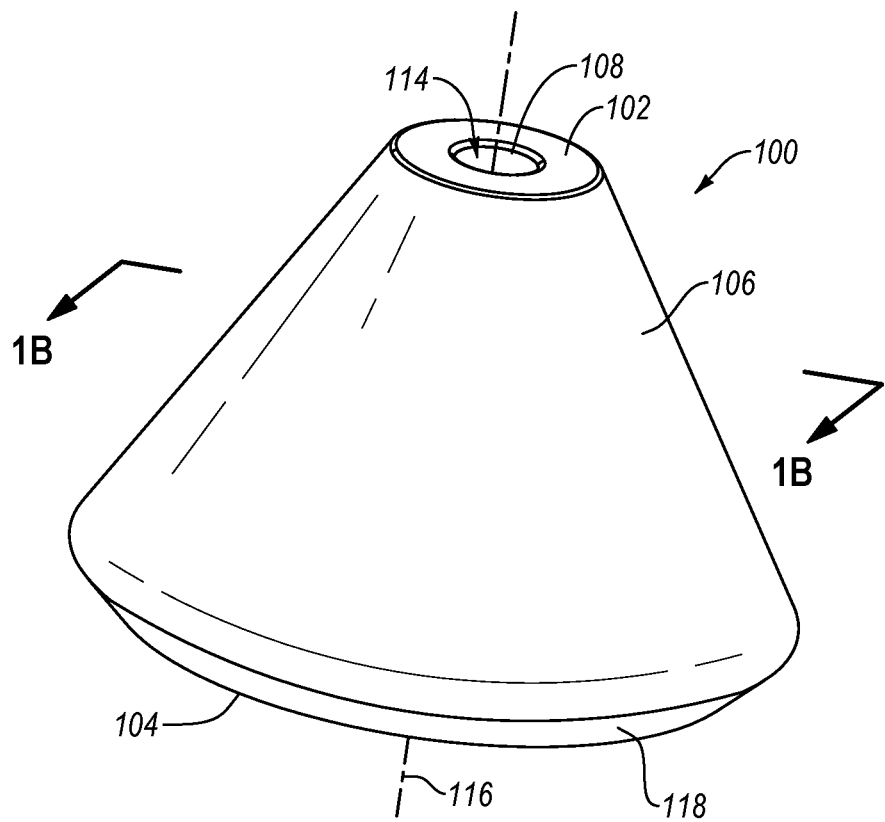
FIG. 1A is an isometric view of a nozzle configured to be used in 3D printing applications, according to an embodiment.

Embodiments are directed to nozzles for 3D printing and related nozzle assemblies and methods of forming and using nozzles and nozzle assemblies. An example nozzle includes at least one top surface, at least one bottom surface, and at least one nozzle lateral surface extending from or near the top surface to or near the bottom surface. The nozzle also includes at least one conduit surface defining a conduit. In some embodiments, at least a portion of the conduit surface may comprise or be formed from at least one of polycrystalline diamond ("PCD") or polycrystalline cubic boron nitride ("PcBN"). The nozzle may be attached to a base to form a nozzle assembly. The nozzle may be attached to the base (e.g., by at least one of swaging the base around a portion of the nozzle, threadedly attaching (either directly or indirectly) the nozzle to the base, press-fitting a hollow hollowed-sleeve into a passageway defined by the base, or any other suitable way to attach the nozzle to the base).

The nozzle assembly that includes the nozzle and the base may be attached to a printing device. The printing device may include any device that is configured to receive the nozzle assembly and perform 3D printing. For example, the printing device may include a platform that is configured to have a material printed therein and a support that is configured to support the nozzle assembly above the platform. At least one of the platform or the support is configured to move relative to each other. During use, the printing device may provide a printing material to the nozzle assembly. The printing material may include at least one polymer, at least one metal, at least one ceramic, or combinations thereof. The printing material may flow through the nozzle assembly (e.g., through the base and the nozzle) and be dispensed on the platform to form a printed material. As used herein, "printing material" refers to the material provided by the printing device to the nozzle assembly and flowing through the nozzle assembly (e.g., a fluid or otherwise flowable material) while "printed material" refers to the material that has been dispensed from the nozzle.

Nozzles commonly used in 3D printing are formed from steel, brass, or other non-superhard materials (e.g., materials exhibiting a hardness that is less that tungsten carbide). Such materials may be sufficient when the printing material flowing therethrough is non-abrasive, such as polycarbonate or other polymers. However, the nozzles formed from non-superhard materials may wear quickly and exhibit a short lifespan when the printing material is abrasive (e.g., includes particles exhibiting a hardness that is greater than or at least comparable to or greater than the hardness of brass or steel). Examples of abrasive printing materials include polymers with one or more particles (e.g., ceramic particles, metal particles, carbon fiber, fiberglass, phosphorescent, wood, diamond, etc.) disposed therein, a ceramic, a metal, a composite, or combinations thereof. Abrasive printing materials may be used in plastic additive manufacturing, directed energy deposition 3D printing, or other printing processes.

In an embodiment, at least a portion of the conduit surface of the nozzles may comprise (or be formed from) PCD, PcBN, another superhard material exhibiting a hardness that is equal to or greater than tungsten carbide, and/or a combination of any of the foregoing. Such nozzles that include PCD and/or PcBN may be able print abrasive printing materials with less wear thereto and/or may exhibit satisfactory lifespans when used with abrasive printing materials. However, due to the high cost and manufacturing limits of PCD and PcBN, the nozzles disclosed herein may be mounted to a base to form a nozzle assembly.

It may be difficult to attach the nozzles disclosed herein to the base to form the nozzle assembly. For example, the nozzles and at least a portion of the base may be heated to high temperatures (e.g., temperatures greater than 200° C. or greater than 300° C.) in association with melting or otherwise controlling the viscosity of the printing material. The high temperatures may prevent the nozzles from being soldered to the base since the high temperatures that the nozzles are heated to may cause the solder to soften or melt. Further, the PCD material may exhibit thermal degradation, especially if the PCD includes a metal-solvent catalyst, when heated to extremely high temperatures (e.g., temperatures greater than 700° C.) thereby limiting the ability to braze the nozzles to the base. As discussed in more detail below, several different attachment mechanisms are provided herein that may be used to attach the nozzles disclosed herein to the bases.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "upper," "lower," and "lateral" refer to the orientations as depicted in the figures.

In some embodiments, deforming one or more materials or elements may be performed through elastic and/or plastic deformation (e.g., substantially reversible and/or substantially irreversible deformation). For example, one or more of a portion of a base or a nozzle may be deformed (e.g., plastically deformed) in order to attach the nozzle to the base.

Figure 1B:
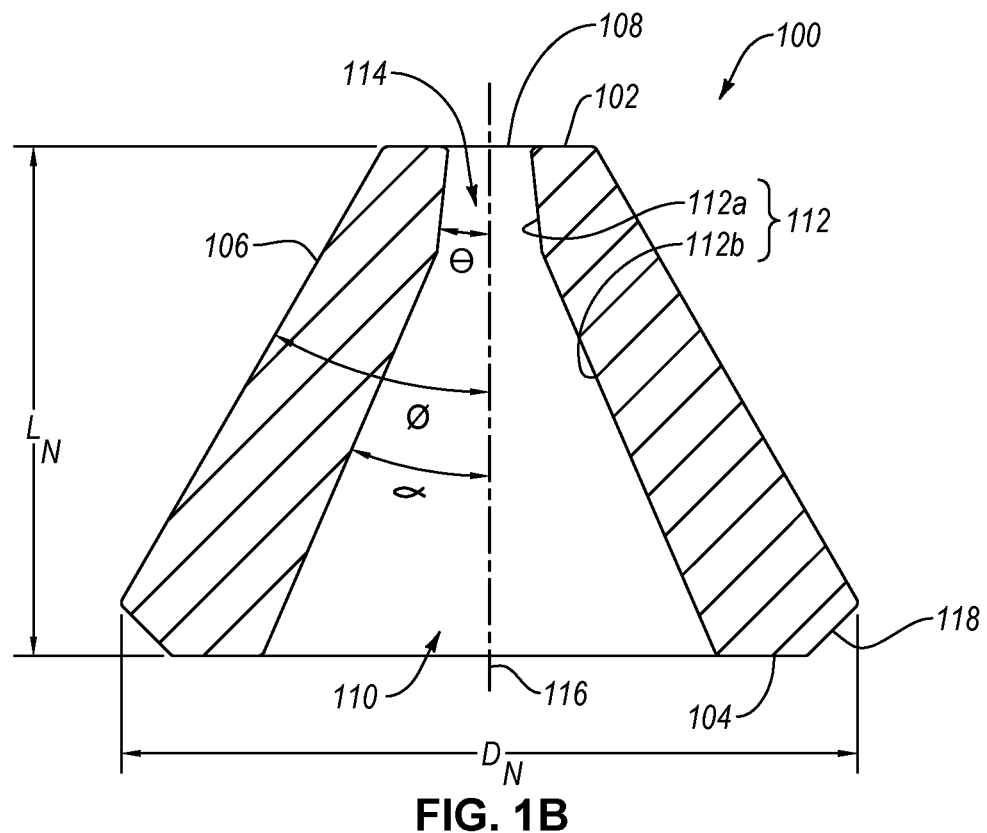
FIG. 1B is a cross-sectional view of the nozzle taken along plane 1A-1A shown in FIG. 1A.

FIG. 1A is an isometric view of a nozzle 100 configured to be used in 3D printing applications, according to an embodiment. FIG. 1B is a cross-sectional view of the nozzle 100 taken along plane 1A-1A shown in FIG. 1A. The nozzle 100 includes at least one top surface 102, at least one bottom surface 104 opposite the top surface 102, and at least one nozzle lateral surface 106 extending from or near the top surface 102 to or near the bottom surface 104. The top surface 102 may define an orifice 108 and the bottom surface 104 may define an opening 110. The nozzle 100 may also include at least one conduit surface 112 extending from, or from a location near, the orifice 108 to, or near to, the opening 110. The conduit surface 112 defines a conduit 114 that extends from the orifice 108 to the opening 110. During use, a printing material enters the conduit 114 through the opening 110, flows through the conduit 114 (e.g., from the opening 110 to the orifice 108), and is dispensed from the nozzle 100 through the orifice 108.

As previously discussed, the top surface 102 of the nozzle defines an orifice 108. The orifice 108 may exhibit a maximum lateral dimension (e.g., diameter) that is about 0.25 mm, about 0.4 mm, about 0.6 mm, about 0.8 mm, about 1.0 mm, about 0.1 mm or greater, about 0.2 mm or greater, about 0.4 mm or greater, about 0.6 mm or greater, about 0.8 mm or greater, about 1 mm or greater, about 1.5 mm or greater, about 2 mm or greater, about 3 mm or less, about 2 mm or less, about 1 mm or less, about 0.75 mm or less, about 0.5 mm or less, or in ranges of about 0.1 mm to about 0.3 mm, about 0.2 mm to about 0.4, about 0.3 mm to about 0.5 mm, about 0.4 mm to about 0.6 mm, about 0.5 mm to about 0.7 mm, about 0.6 mm to about 0.8 mm, about 0.7 mm to about 0.9 mm, about 0.8 mm to about 1 mm, about 0.9 mm to about 1.5 mm, about 1 mm to about 2 mm, or about 1.5 mm to about 3 mm. The maximum lateral dimension of the orifice 108 may affect the achievable resolution of the printed material and rate at which the nozzle 100 may dispense the printing material. For example, increasing the maximum lateral dimension of the orifice 108 may increase the rate at which the nozzle 100 may dispense the printing material but may decrease the accuracy of the printed material. In an embodiment, as shown, the orifice 108 may exhibit a generally circular shape and, in such an embodiment, the maximum lateral dimension is the diameter of the generally circular shape. In an embodiment, the orifice 108 may exhibit a generally non-circular shape, such as a generally oblong shape, a polygonal shape, elliptical shape, rectangular shape, hexagonal shape, or star-like shape.

The top surface 102 may exhibit a surface area that is about 0.075 $mm^2$ or greater, about 0.1 $mm^2$ or greater, about 0.2 $mm^2$ or greater, about 0.3 $mm^2$ or greater, about 0.5 $mm^2$ or greater, about 0.7 $mm^2$ or greater, about 1 $mm^2$ or greater, about 1.25 $mm^2$ or greater, about 1.5 $mm^2$ or greater, about 2 $mm^2$ or greater, about 3 $mm^2$ or greater, about 4 $mm^2$ or greater, or in ranges of about 0.075 $mm^2$ to about 0.2 $mm^2$, about 0.1 $mm^2$ to about 0.3 $mm^2$, about 0.2 $mm^2$ to about 0.4 $mm^2$, about 0.3 $mm^2$ to about 0.5 $mm^2$, about 0.4 $mm^2$ to about 0.6 $mm^2$, about 0.5 $mm^2$ to about 0.7 $mm^2$, about 0.6 $mm^2$ to about 0.8 $mm^2$, about 0.7 $mm^2$ to about 0.9 $mm^2$, about 1 $mm^2$ to about 1.25 $mm^2$, about 1 $mm^2$ to about 1.5 $mm^2$, about 1.25 $mm^2$ to about 1.75 $mm^2$, about 1.5 $mm^2$ to about 2 $mm^2$, about 1.75 $mm^2$ to about 3 $mm^2$, or about 2 $mm^2$ to about 4 $mm^2$. In an example, the surface area of the top surface 102 may be selected based on the maximum lateral dimension of the orifice 108 since increasing the maximum lateral dimension of the orifice 108 may result in an increase of the surface area of the top surface 102. In an example, the surface area of the top surface 102 may be selected to be relatively small to decrease the likelihood that the top surface 102 contacts the printed material during use and/or decrease the adverse effect (e.g., smudging, dragging, or flattening) of the top surface 102 contacting the printed material.

In an embodiment, as illustrated in FIGS. 1A and 1B, the top surface 102 may be generally planar. In an embodiment, not shown, at least a portion of the top surface 102 may be non-planar, such as curved or tapered. The top surface 102 that is at least partially curved or tapered may decrease the likelihood that the top surface 102 contacts the printed material during use. For example, the nozzle assembly may not extend perpendicular to the printed material. The curved or tapered portions of the top surface 102 may prevent portions of the top surface 102 from contacting the printed material that would otherwise protrude or be more likely to contact the printed material if the top surface 102 was planar due to the non-perpendicular angle of the nozzle assembly relative to the printed material. Examples of nozzles that include a non-planar top surface are disclosed in U.S. Provisional Patent Application No. 63/171,718, filed on Apr. 7, 2021, the disclosure of which is incorporated herein, in its entirety, by this reference.

The bottom surface 104 is configured to contact one or more surfaces of the base ("base contact surface"). An example of a base contact surface is the base contact surface 342 of shown and described with respect to FIGS. 3A and 3B. The bottom surface 104 may exhibit a surface topography that generally corresponds to base contact surface. For example, the bottom surface 104 may exhibit a generally planar topography when base contact surface is also generally planar. Selecting the bottom surface 104 to exhibit a surface topography that generally corresponds to the base contact surface may reduce the size of gaps present between the bottom surface 104 and the base contact surface. Gaps present between the bottom surface 104 and base contact surface may allow printing material to leak between the bottom surface 104 and the base contact surface. The printing material leaking between the bottom surface 104 and the base contact surface may result in material being discharged from a portion of the nozzle assembly other than the orifice 108. The printing material leaking between the bottom surface 104 and the base contact surface may also result in contamination of the printed material. For example, the leaked printing material may be cured or compositionally different than a printing material subsequently flowing through the conduit 114, the mixing of either of which with the printing material flowing through the conduit 114 may result in printing flaws. In an embodiment, the bottom surface 104 may be generally parallel to the top surface 102.

At least a portion of the nozzle lateral surface 106 may be non-vertical. The nozzle lateral surface 106 may be non-vertical, for example, when the lateral surface 106 is non-parallel to a central axis 116 of the nozzle 100 (e.g., an axis that extends from a center of the top surface 102 to a center of the bottom surface 104). For instance, at least about 55%, at least about 60%, at least about 70%, at least about 80%, at least about 90%, about 100% (as shown), or in ranges of about 55% to about 70%, about 60% to about 80%, about 70% to about 90%, or about 80% to about 100% of the nozzle lateral surface 106 is non-vertical. The percentage of the nozzle lateral surface 106 that is non-vertical may relate to the percentage of at least one of the surface area, the percentage of the length $L_N$ of the nozzle 100 along which the nozzle lateral surface 106 is non-vertical, or a length of the lateral surface 106 measured along a shortest path from the top surface 102 to the bottom surface 104 (including or excluding any chamfers) that extends along an exterior of the nozzle lateral surface 106 that is non-vertical. Selecting the percentage of the nozzle lateral surface 106 that is non-vertical to be greater than 55% and, further, increasing the percentage of the nozzle lateral surface 106 that is non-vertical may facilitate attachment of the nozzle 100 to a base. For example, as will be discussed in more detail below, the nozzle 100 may be positioned within a recess defined in the base and may be attached to a base. The recess may define a recess opening (e.g., after swaging) that is less than one or more dimensions (e.g., less than a maximum lateral dimension $D_N$) of the nozzle 100 which prevents the nozzle 100 from leaving the recess and secures the nozzle 100 to the base. Increasing the percentage of the nozzle lateral surface 106 that is non-vertical may enable more of the nozzle lateral surface 106 to be contacted by the surfaces of the base that define the recess thereby better securing the nozzle 100 to the recess. Further, increasing the percentage of the nozzle 100 that is non-vertical, such as portions of the nozzle 100 that are more proximate to the bottom surface 104, increases the distance that the top surface 102 may protrude from the base, as discussed in more detail with regards to FIG. 4B.

The non-vertical portion(s) of the nozzle lateral surface 106 may extend at an angle ϕ relative to the central axis 116. The angle ϕ may be selected to be about 1° to about 89°, such as about 1° to about 5°, about 4° to about 10°, about 7.5° to about 15°, about 10° to about 20°, about 15° to about 25°, about 20° to about 30°, about 25° to about 35°, about 30° to about 40°, about 35° to about 45°, about 40° to about 50°, about 45° to about 55°, about 50° to about 60°, about 55° to about 65°, about 60° to about 70°, about 65° to about 75°, about 70° to about 80°, about 75° to about 82.5°, about 80° to about 85°, or about 84° to about 89°. Generally, increasing the angle ϕ may cause the maximum lateral dimension $D_N$ of the nozzle 100 to increase more rapidly thereby strengthening the nozzle 100. Decreasing the angle ϕ may allow the distance that the top surface 102 of the nozzle 100 protrudes from the base to be increased.

Figure 7:
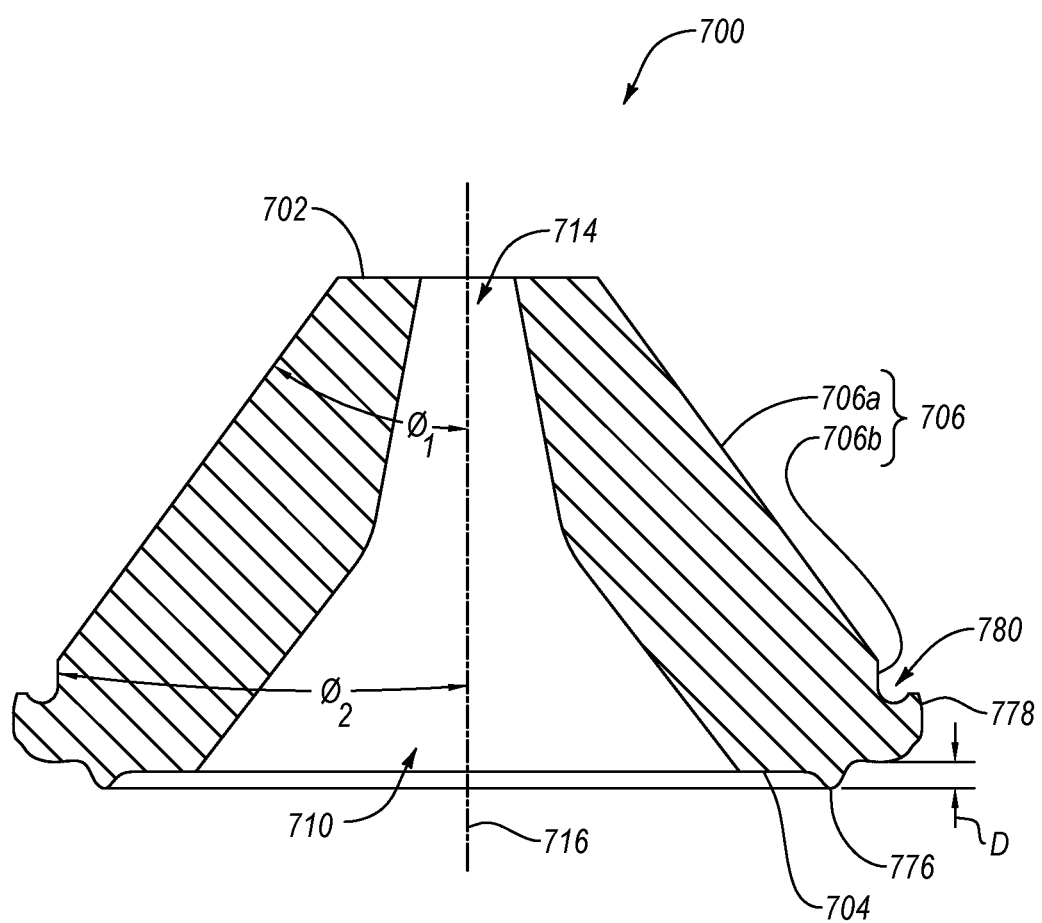
FIG. 7 is a schematic cross-sectional of a nozzle that include one or more protrusions, according to an embodiment.

In an embodiment, the nozzle lateral surface 106 includes a generally conically shaped surface. However, the nozzle lateral surface 106 may include a plurality of surfaces or a non-conical surface, without limitation. In an example, the nozzle lateral surface 106 may include a plurality of surfaces (as shown in FIG. 7), wherein an angle that each surface of the nozzle lateral surface 106 extends relative to the central axis 116 of the nozzle 100 may be different. The angles that each of the plurality of nozzle lateral surfaces extend relative to the central axis 116 may be independently selected from any of the angles ϕ discussed above. The plurality of nozzle lateral surfaces 106 may facilitate attachment of the nozzle 100 to the base and may increase the distance that the top surface 102 of the nozzle 100 may extend above the base. In an example, at least a portion of the nozzle lateral surface 106 may exhibit a generally prism shape, a generally frustum shape, a generally cylindrical shape, a generally conical shape (e.g., frustoconical) or any other suitable shape.

In an embodiment, the nozzle 100 includes a chamfer 118 extending from the bottom surface 104 to the nozzle lateral surface 106. The chamfer 118 may include a rounded corner (e.g., a rounded corner exhibiting an average radius of curvature that is greater than 0 about 0.025 mm, greater than about 0.05 mm, greater than about 0.1 mm, or greater than about 0.2 mm) and/or one or more transitional surfaces extending between the bottom surface 104 and the nozzle lateral surface 106. The chamfer 118 may facilitate insertion of the nozzle 100 into the base (e.g., into the recess 340 illustrated in FIGS. 3A and 3B). In an embodiment, not illustrated, the nozzle 100 includes a chamfer extending from the top surface 102 to the nozzle lateral surface 106. The chamfer may include a rounded corner and/or one or more transitional surfaces extending between the top surface 102 and the nozzle lateral surface 106. The chamfer between the top surface 102 and the nozzle lateral surface 106 may prevent or at least decrease the likelihood that the top surface 102 contacts the printed material than if the top surface 102 meet the nozzle lateral surface 106 at a sharp corner.

At least a portion of at least one of the top surface 102, the bottom surface 104, the nozzle lateral surface, or any other exterior surface of the nozzle 100 (e.g., the chamfer 118) may be polished to exhibit a root mean square ("RMS") surface roughness that is 3 µm or less, about 2 µm or less, about 1.5 µm or less, about 1 µm or less, about 750 nm or less, about 500 nm or less, about 300 nm or less, about 200 nm or less, about 100 nm or less, about 75 nm or less, about 50 nm or less, about 30 nm or less, about 15 nm or less, or about 15 nm to about 50 nm, about 30 nm to about 75 nm, about 50 nm to about 100 nm, about 75 nm to about 200 nm, about 100 nm to about 300 nm, about 200 nm to about 500 nm, about 300 nm to about 750 nm, about 500 nm to about 1 about 750 nm to about 1.5 about 1 µm to about 2 about 1.5 µm to about 3 In an example, decreasing the RMS surface roughness of at least a portion of the top surface 102 may decrease the coefficient of friction between the polished portion of the top surface 102 and the printed material. As such, the polished portion of the top surface 102 may be less likely to pull portions of the printed material in the direction that the nozzle 100 moves relative to the printed material when the top surface 102 contacts the printed material. In an example, contacting a polished portion of the top surface 102 against the printed material may cause the top surface 102 to impart a smooth surface to the printed material which may be used to influence (e.g., improve) the deposition of the next layer of printed material on the already printed material and/or may impart a desired shape to the printed material. In an example, polishing the bottom surface 104 and/or the nozzle lateral surface 106 to any of the RMS surface roughness discussed above may reduce gaps between the bottom surface 104 and/or the nozzle lateral surface 106 and the base that would otherwise form therebetween.

As previously discussed, the nozzle 100 includes at least one conduit surface 112 defining the conduit 114. At least a portion of the conduit surface 112 may form a generally cylindrical shape, a generally conical shape, or any other suitable shape. In an embodiment, the conduit surface 112 may include two or more definable surfaces. In an example, the conduit surface 112 may include a first conduit surface 112a extending from or near the top surface 102 and a second conduit surface 112b extending from or near the bottom surface 104. The first conduit surface 112a may extend relative to the central axis 116 at an angle θ and the second conduit surface 112b may extend relative to the central axis 116 at an angle α. The angle α may be selected to be greater than the angle θ and the angle θ may be selected to be greater than 0° (e.g., the first conduit surface 112a does not form a cylindrical shape). Surprisingly, such angles θ and α decrease the force required to push the printing material through the conduit 114 and may facilitate quick and complete removal of an initial printing material when switching from the initial printing material to another printing material. In an example, the conduit surface 112 may include at least one additional conduit surface (not shown) in addition to the first and second conduit surfaces 112a, 112b, wherein the additional conduit surface extends relative to the central axis 116 at a non-zero angle that is different the angles θ and α. The additional conduit surface may further decrease the force required to push the printing material through the conduit 114. Further examples of the plurality of conduit surfaces that may form the conduit 114 are disclosed in U.S. Provisional Patent Application No. 63/171,718, filed on Apr. 7, 2021, the disclosure of which was previously incorporated. In an embodiment, the conduit surface 112 may only include a single surface extending from or near the top surface 102 to or near the bottom surface 104.

In an embodiment, as illustrated, the conduit 114 extends from the top surface 102 to the bottom surface 104. The conduit 114 may also extend generally parallel to and concentrically relative to the central axis 116. However, it is noted that the conduit 114 may extend in other directions than what is illustrated. In an example, the conduit 114 may extend non-parallel to the central axis 116 and/or may be located off-center. In an example, the conduit 114 may include a bend therein. The bend may allow the conduit 114 to extend from the top surface 102 to the nozzle lateral surface 106 or to a location of the bottom surface 104 that is not directly below the orifice 108. How the conduit 114 extends into the nozzle 100 may depend on where the passageway of the base to which the nozzle 100 is attached (e.g., passageway 360 shown in FIG. 3B) meets the conduit 114 since the passageway of the base and the conduit 114 are in fluid communication.

In an embodiment, the conduit 114 is partially defined by one or more conduit chamfers (not shown). The conduit chamfers (e.g., rounded corners and/or transition surfaces) may extend from the top surface 102 to the conduit surface 112 and/or from the bottom surface 104 to the conduit surface 112. The conduit chamfers may increase the maximum lateral dimension (e.g., diameter) of the conduit 114 the orifice 108 or the opening 110. Increasing the maximum lateral dimension of the conduit 114 at the orifice 108 with the conduit chamfer may improve the consistency of the printed material dispensed from the nozzle 100 (e.g., minimize variations the lateral dimension(s) of the printing material) thereby improving the resolution of the printed material. Increasing the maximum lateral dimension of the conduit 114 at the opening 110 with the conduit chamfer may decrease the pressure required to push the printing material from the passageway of the base into the conduit 114.

In an embodiment, at least a portion of the conduit surfaces 112a, 112b and/or any interior surface of the nozzle 100 that comes in contact with the printing material (e.g., the conduit chamfers) may be polished to exhibit an RMS surface roughness that is about 100 μm or less, about 90 μm or less, about 80 μm or less, about 70 μm or less, about 60 μm or less, about 50 μm or less, about 40 μm or less, about 30 μm or less, about 20 μm or less, about 10 μm or less, or in ranges of about 10 μm to about 30 μm, about 20 μm to about 40 μm, about 30 μm to about 50 μm, about 40 μm to about 60 μm, about 50 μm to about 70 μm, about 60 μm to about 80 μm, about 70 μm to about 90 μm, or about 80 μm to about 100 μm. Polishing and, more particularly decreasing the surface roughness, of the conduit surface 112 and/or any interior surface of the nozzle 100 that comes in contact with the printing material decreases the coefficient of friction between such surfaces and the printing material. The reduced coefficient of friction may decrease the pressure required to push the printing material through the conduit 114 and/or may increase the consistency of the printing material dispensed from the nozzle 100. In an embodiment, at least a portion of the conduit surface 112 and/or any of interior surface of the nozzle 100 that contact the printing material may exhibit an RMS surface roughness that is greater than the RMS surface roughness of a polished exterior surface of the nozzle 100 because the exterior surfaces of the nozzle 100 may be easier to polish than the interior surfaces of the nozzle 100.

As previously discussed, the nozzle 100 exhibits a maximum lateral dimension $D_N$. The nozzle 100 also exhibits a maximum length $L_N$ measured from the top surface 102 to the bottom surface 104 parallel to the central axis 116. The maximum lateral dimension $D_N$ and the maximum length $L_N$ of the nozzle 100 may be independently selected to be about 1 mm or greater, about 2 mm or greater, about 3 mm or greater, about 4 mm or greater, about 5 mm or greater, about 7.5 mm or greater, about 10 mm or greater, about 15 mm or greater, about 20 mm or greater, about 25 mm or greater, about 30 mm or greater, about 8 mm or less, about 6 mm or less, about 5 mm or less, about 4 mm or less, about 3 mm or less, about 2 mm or less, or in ranges of about 1 mm to about 1.5 mm, about 1.25 mm to about 1.75 mm, about 1.5 mm to about 2 mm, about 1.75 mm to about 2.25 mm, about 2 mm to about 2.5 mm, about 2.25 mm to about 2.75 mm, about 2.5 mm to about 3 mm, about 2.75 mm to about 3.25 mm, about 3 mm to about 3.5 mm, about 3.25 mm to about 3.75 mm, about 3.5 mm to about 4 mm, about 3.75 mm to about 4.25 mm, about 4 mm to about 4.5 mm, about 4.25 mm to about 4.75 mm, about 4.5 mm to about 5 mm, about 4.75 mm to about 5.5 mm, about 5 mm to about 6 mm, about 5.5 mm to about 7 mm, about 6 mm to about 8 mm, about 7 mm to about 10 mm, about 9 mm to about 15 mm, about 10 mm to about 20 mm, about 15 mm to about 25 mm, or about 20 mm to about 30 mm. The maximum lateral dimension $D_N$ and the length $L_N$ may be selected for a variety of reasons. In an example, the maximum lateral dimension $D_N$ may be selected to correspond to (e.g., be the same, slightly larger, or slightly smaller than) the maximum lateral dimension of the recess of the base that the nozzle 100 is disposed in to minimize movement of the nozzle 100 in the recess. In an example, the maximum length $L_N$ may be selected based on the desired distance that the top surface 102 extends from the base. In an example, the maximum lateral dimension $D_N$ and the maximum length $L_N$ may be selected based on the maximum lateral dimension of the orifice 108 since increasing the maximum lateral dimension of the orifice 108 may increase the maximum lateral dimension $D_N$ and the maximum length $L_N$. In an example, the maximum lateral dimension $D_N$ and the maximum length $L_N$ may be selected based on the surface area of the top surface 102 since increasing the surface area of the top surface 102 may increase the maximum lateral dimension $D_N$ and the maximum length $L_N$. In an example, the maximum lateral dimension $D_N$ and the maximum length $L_N$ may be selected based on the percentage of the nozzle lateral surface 106 that is non-vertical and the angle $\phi$ that the non-vertical portions of the nozzle lateral surface 106 extend relative to the central axis 116.

Figure 2:
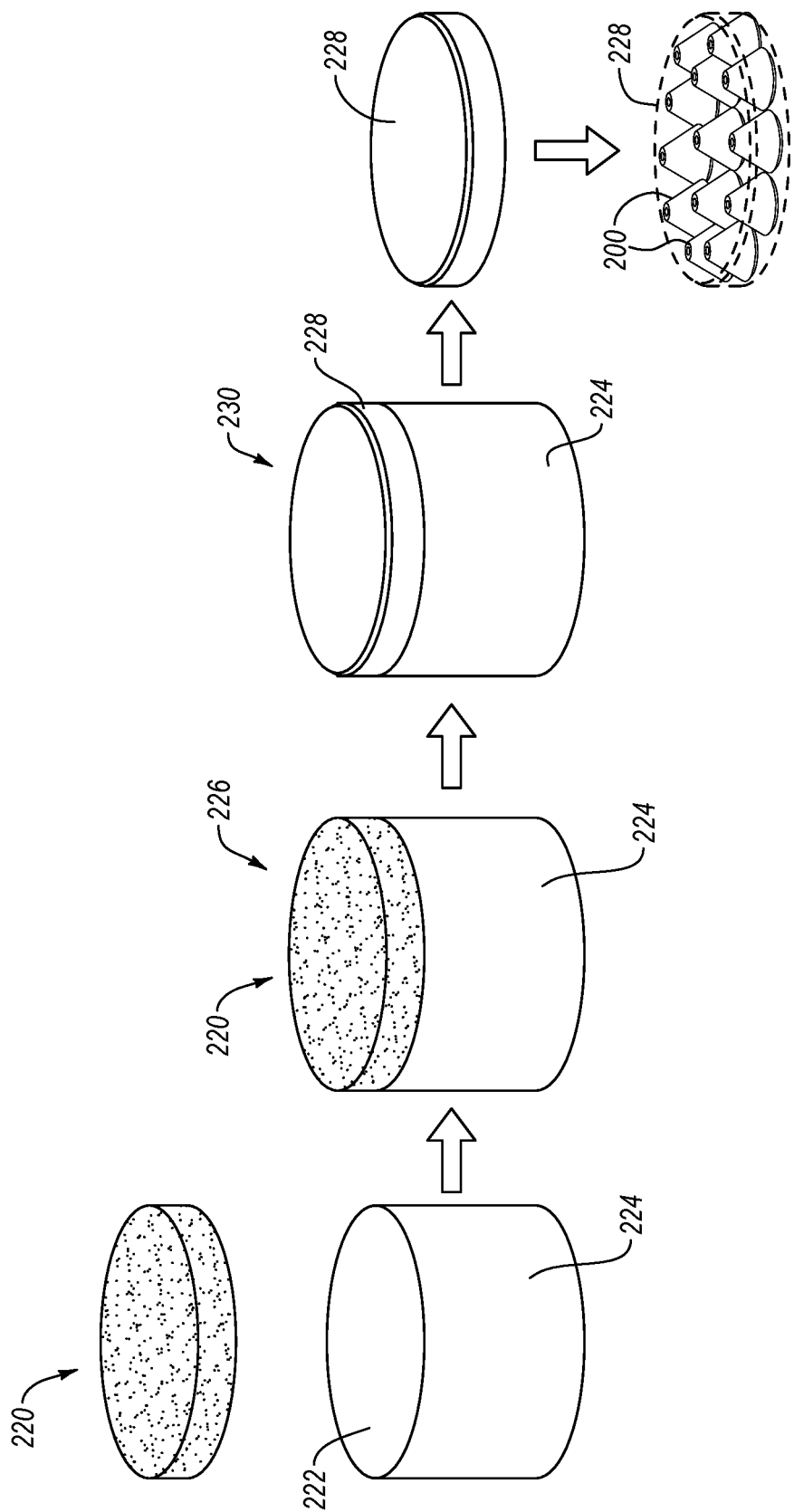
FIG. 2 is a schematic illustration of an embodiment of a method for fabricating the nozzle illustrated in FIGS. 1A and 1B from PCD, according to an embodiment.

FIG. 2 is a schematic illustration of an embodiment of a method for fabricating the nozzle 100 illustrated in FIGS. 1A and 1B from PCD, according to an embodiment. It is noted that the method illustrated in FIG. 2 may be used to form any of the nozzles disclosed herein. Referring to FIG. 2, a mass of diamond particles 220 is provided. The diamond particles 220 may exhibit an average particle size of about 50 μm or less, such as about 40 μm or less, about 30 μm or less, about 20 μm or less, about 10 μm to about 18 μm, or about 15 μm to about 18 μm. In some embodiments, the average particle size of the diamond particles 220 may be about 10 μm or less, such as about 2 μm to about 5 μm or submicron. The average particle size of the diamond particles 220 may be selected to minimize volume loss of the nozzle formed thereby. For example, it has been found that the printing material flowing through the conduit of the nozzle may cause some of the diamond grains to become dislodged thereby resulting in volume loss (i.e., wear) of the nozzle. To minimize volume loss, the diamond particles 220 may be selected to exhibit an average particle size that is less than 40 μm such that dislodging one or a few diamond grains has negligible effect on the volume of the nozzle. However, it is noted that decreasing the average particle size of the diamond particles 220 may further limit volume loss and, as such, the diamond particles 220 may be selected to exhibit an average particle size that is significantly less than 40 μm, such as less than 20 μm or less than 10 μm.

In an embodiment, the diamond particles 220 may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the mass of diamond particles 220 may include a portion exhibiting a relatively larger size (e.g., 30 μm, 20 μm, 15 μm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In one embodiment, the mass of diamond particles 220 may include a portion exhibiting a relatively larger size between about 10 µm and about 40 µm and another portion exhibiting a relatively smaller size between about 1 µm and 4 µm. In some embodiments, the mass of diamond particles 220 may comprise three or more different sizes (e.g., one relatively larger size and two or more relatively smaller sizes), without limitation. It is noted that the as-sintered diamond grain size may differ from the average particle size of the mass of diamond particles prior to sintering due to a variety of different physical processes, such as grain growth, diamond particles fracturing, carbon provided from another carbon source (e.g., dissolved carbon in the metal-solvent catalyst), or combinations of the foregoing.

The mass of diamond particles 220 is positioned adjacent to the interfacial surface 222 of the substrate 224 to form an assembly 226. The substrate 224 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in one embodiment, the substrate 224 comprises cobalt-cemented tungsten carbide. The substrate 224 may be generally cylindrical or another selected configuration, without limitation. Although FIG. 2 shows an interfacial surface 222 of the substrate 224 as being substantially planar, the interfacial surface 222 may exhibit a selected nonplanar topography, such as a grooved, ridged, or other nonplanar interfacial surface.

The assembly 226 also includes a catalyst configured to sinter the mass of diamond particles 220. The catalyst may be provided in particulate form mixed with the mass of diamond particles 220, as a thin foil or plate placed adjacent to the mass of diamond particles 220, from the substrate 224 (e.g., the substrate 224 is a cemented carbide substrate including a metal-solvent catalyst), or combinations thereof. In an embodiment, the catalyst includes a metal-solvent catalyst (e.g., iron, nickel, cobalt, or alloys thereof). In an embodiment, the catalyst includes at least one nonmetallic catalyst selected from one or more of alkali metal carbonate (e.g., one or more carbonates of Li, Na, and K), one or more alkaline earth metal carbonates (e.g., one or more carbonates of Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, a chloride (e.g., one or more chlorides of Li, Na, and K), elemental sulfur and/or a derivative thereof, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a geranium alloy), and combinations of the foregoing. In an example, the catalyst includes one or more metal-solvent catalysts and one or more nonmetallic catalysts.

In order to efficiently sinter the mass of diamond particles 220, the assembly 226 may be enclosed in a pressure transmitting medium, such as a refractory metal can, graphite structure, pyrophyllite, and/or other suitable pressure transmitting structure to form a cell assembly. Examples of suitable gasket materials and cell structures for use in manufacturing PCD are disclosed in U.S. Pat. Nos. 6,338,754 and 8,236,074, each of which is incorporated herein, in its entirety, by this reference. Another example of a suitable pressure transmitting material is pyrophyllite, which is commercially available from Wonder stone Ltd. of South Africa.

The cell assembly 226, including the pressure transmitting medium and mass of diamond particles 220 therein, is subjected to an HPHT process using an ultra-high pressure press at a temperature of at least about 1000° C. (e.g., about 1100° C. to about 2200° C., or about 1200° C. to about 1450° C.) and a pressure in the pressure transmitting medium of at least about 7.5 GPa (e.g., about 7.5 GPa to about 15 GPa, at least about 8.0 GPa, at least about 9.0 GPa, at least about 10.0 GPa, at least about 11.0 GPa, at least about 12.0 GPa, or at least about 14 GP) for a time sufficient to sinter the diamond particles 220 together in the presence of the catalyst and form the PCD table 228 comprising bonded diamond grains defining interstitial regions occupied by the catalyst. The HPHT process may form a PCD compact (PDC) 230 that includes the PCD table 228 bonded to the substrate During the HPHT process, the catalyst may liquefy and, if the catalyst is disposed outside the diamond particles 220, the catalyst may infiltrate the mass of diamond particles 220. The catalyst promotes growth between adjacent diamond particles of the mass of diamond particles 220 to form the PCD table 228 comprised of a body of bonded diamond grains having the infiltrated catalyst interstitially disposed between bonded diamond grains. For example, if the substrate 224 is a cobalt-cemented tungsten carbide substrate, cobalt from the substrate 224 may be liquefied and infiltrate the mass of diamond particles 220 to catalyze formation of the PCD table 228.

The pressure values employed in the HPHT processes disclosed herein refer to the pressure in the pressure transmitting medium at room temperature (e.g., about 25° C.) with application of pressure using an ultra-high pressure press and not the pressure applied to exterior of the cell assembly 226. The actual pressure in the pressure transmitting medium at sintering temperature may be slightly higher. The ultra-high pressure press may be calibrated at room temperature by embedding at least one calibration material that changes structure at a known pressure, such as PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

In other embodiments, a PCD table 228 according to an embodiment may be separately formed using an HPHT sintering process and, subsequently, bonded to the interfacial surface 222 of the substrate 224 by brazing, using a separate HPHT bonding process, or any other suitable joining technique, without limitation. In yet another embodiment, a substrate 224 may be formed by depositing a binderless carbide (e.g., tungsten carbide) via chemical vapor deposition onto the separately formed PCD table 228.

In any of the embodiments disclosed herein, substantially all or a selected portion of the catalyst (e.g., metal-solvent catalyst) may be removed (e.g., via leaching) from the PCD table 228. In an embodiment, metal-solvent catalyst in the PCD table 228 may be removed to a selected depth from at least one exterior working surface (e.g., the working surface and/or a sidewall working surface of the PCD table 228) so that only a portion of the interstitial regions are occupied by metal-solvent catalyst. For example, substantially all or a selected portion of the metal-solvent catalyst may be removed from the PCD table 228 so-formed in the PDC 230 to a selected depth from the working surface.

In another embodiment, a PCD table 228 may be fabricated according to any of the disclosed embodiments in a first HPHT process, leached to remove substantially all of the metal-solvent catalyst from the interstitial regions between the bonded diamond grains, and subsequently bonded to a substrate in a second HPHT process. In the second HPHT process, an infiltrant from, for example, a cemented carbide substrate may infiltrate into the interstitial regions from which the metal-solvent catalyst was depleted. For example, the infiltrant may be cobalt that is swept-in from a cobalt-cemented tungsten carbide substrate. In one embodiment, the first and/or second HPHT process may be performed at a pressure of at least about 7.5 GPa. In one embodiment, the infiltrant may be leached from the infiltrated PCD table 228 using a second acid leaching process following the second HPHT process.

In an embodiment, the PCD table 228 may be a binderless PCD table. The binderless PCD table may be formed by pressing a mass of diamond particles with or without additives such as a catalyst. The diamond particles are pressed without any metal-solvent catalyst being present. For example, the mass of diamond particles may not be disposed on a cobalt-cemented tungsten carbide substrate. The binderless PCD table may be pressed using any of the pressures and temperatures disclosed herein.

In an embodiment, as shown, the substrate 224 may be removed or otherwise detached from the PCD table 228. For example, the substrate 224 may be removed from the PCD table 228 by grinding the substrate 224 or dissolving the substrate 224 in an acid. In an embodiment, not shown, at least a portion of the substrate 224 is not removed or otherwise detached from the PCD table 228. In such an embodiment, the substrate 224 may form a portion of the nozzle(s) formed from the PCD table 228.

Portions of the PCD table 228 and, optionally, the substrate 224 may be removed to form one or more nozzles 200. For example, portions of the PCD table 228 and, optionally, the substrate 224 may be removed to form 1, 2, 3, 4, 5, 6, 7, 8, 9, 10, 11, 12, 13, 14, 15, 16, 17, 18, 19, 20, or greater than 20 nozzles 200. The number of nozzles 200 formed from the PCD table 228 and, optionally, the substrate 224 may depend on the size (e.g., maximum lateral dimension and thickness) of the PCD table 228, the shape of the PCD table 228, whether the substrate 224 forms a portion of the nozzles 200, the size of the nozzles 200, and the shape of the nozzles 200. It is noted that the nozzles 200 formed from the PCD table 228 and, optionally, the substrate 224 may include one or more feature that is the same or substantially similar to any one or more feature of the nozzles disclosed herein, without limitation.

In an embodiment, the portions of the PCD table 228 and, optionally, the substrate 224 may be removed using a laser. In such an embodiment, the laser may emit a plurality of laser pulses towards one or more surfaces of the PCD table 228 and, optionally, the substrate 224. The laser pulses may be selected to remove the PCD table 228 in one or more layers. The laser ablation process may accomplish at least one of the following: form a plurality of nozzles 200 from the PCD table 228 (e.g., simultaneously or substantially simultaneously) form the exterior features (e.g., top surface, bottom surface, nozzle lateral surface, etc.), form interior features (e.g., conduit) of the nozzle 200, or polish the surfaces of the nozzles 200. Examples of lasing methods that may be used to remove portions of the PCD table 228 are disclosed in U.S. patent application Ser. No. 16/084,469 filed on Jan. 10, 2018, the disclosure of which is incorporated herein, in its entirety, by this reference.

In an embodiment, the portions of the PCD table 228 and, optionally, the substrate 224 may be removed using one or more of grinding, lapping, laser ablation, electrical discharge machining (e.g., wire electrical discharge machining), combinations of the foregoing, or any other machining technique. Unlike lasing, some machining techniques such as grinding, lapping, and electrical discharge machining may at least one of exhibit high wear due to the hardness of diamond, may be unable to form all of the nozzles 200 collectively (e.g., in a single process), form both the exterior and interior features of the nozzles 200, or polish the surfaces of the nozzles 200. In an embodiment, the portions of the PCD table 228 and, optionally, the substrate 224 may be removed using lasing and one or more of grinding, lapping, electrical discharge machining, or any other machining technique.

Referring back to FIGS. 1A and 1B, as previously discussed, the nozzle 100 may be at least partially formed from PcBN instead of or in addition to PCD. More generally, nozzles disclosed herein may comprise one or more superhard material (e.g., PCD, PCBN, silicon carbide, or any material having a hardness exceeding the hardness of tungsten carbide), without limitation. For example, the nozzle 100 may be at least partially formed from PcBN due the hardness and thermal conductivity of PcBN, which is comparable to the hardness and thermal conductivity of PCD. The nozzle formed from PcBN may decrease the wear on the nozzle 100, may increase the lifespan of the nozzle 100, may allow the nozzle 100 to be used with abrasive printing materials, and may improve the consistency of the printing material formed using the nozzle 100. The PcBN may exhibit a thermal stability that is greater than PCD thereby allowing the nozzle 100 formed from PcBN to be heated to greater temperatures than if the nozzle 100 includes PCD. For example, PCD may exhibit thermal degradation when heated to a temperature that is greater than 700° C. when the PCD includes a metal-solvent catalyst and the PcBN may be heated to temperatures that are greater than 700° C. substantially without degradation.

In an embodiment, as illustrated, all of the nozzle 100 is formed from PcBN. Forming all of the nozzle 100 from PcBN may make manufacturing the nozzle 100 easier since there is no need to attach the PcBN to another material and improve the wear characteristics of the nozzle 100. In another embodiment, only a portion of the nozzle 100 is formed from PcBN. Forming only a portion of the nozzle 100 from PcBN may make shaping and machining the nozzle 100 easier since the other materials of the nozzle 100 may be less hard than the PcBN. However, forming only a portion of the nozzle 100 from PcBN may require bonding the PcBN to another material thereby increasing the complexity of manufacturing the nozzle 100. Also, the fact that portions of the nozzle 100 comprise (or are formed from) a less hard material than PcBN may increase wear on such portions of the nozzle 100 that comprise (or are formed from) the less hard material thereby decreasing the lifespan of the nozzle 100. In an example, when only a portion of the nozzle 100 includes PcBN, at least a portion of the conduit surface 112 and, more particular, the portion of the conduit surface 112 and any other interior surface of the nozzle 100 adjacent to the orifice 108 is defined by PcBN. In such an example, the PcBN may reduce wear of the orifice 108 compared to a less hard material thereby maintaining the consistency of the printing material dispensed from the nozzle 100 than if the nozzle 100 were entirely formed from the less hard material.

The PcBN may be formed by heating boron nitride at any of the same temperatures and pressures discussed above, such as a temperature of about 1000° C. to about 1450° C. and a pressure of about 5 GPa to about 14 GPa. Catalysts for PcBN include, for example, alkali metals, antimony, lead, tin, lithium, magnesium, and nitrides. After forming the PcBN, one or more nozzles may be formed therefrom using the same techniques disclosed above with regards to PCD. For example, the nozzles may be formed by lasing, grinding, lapping, electrical discharge machining, or any other suitable machining technique.

Figures 3A, 3B:
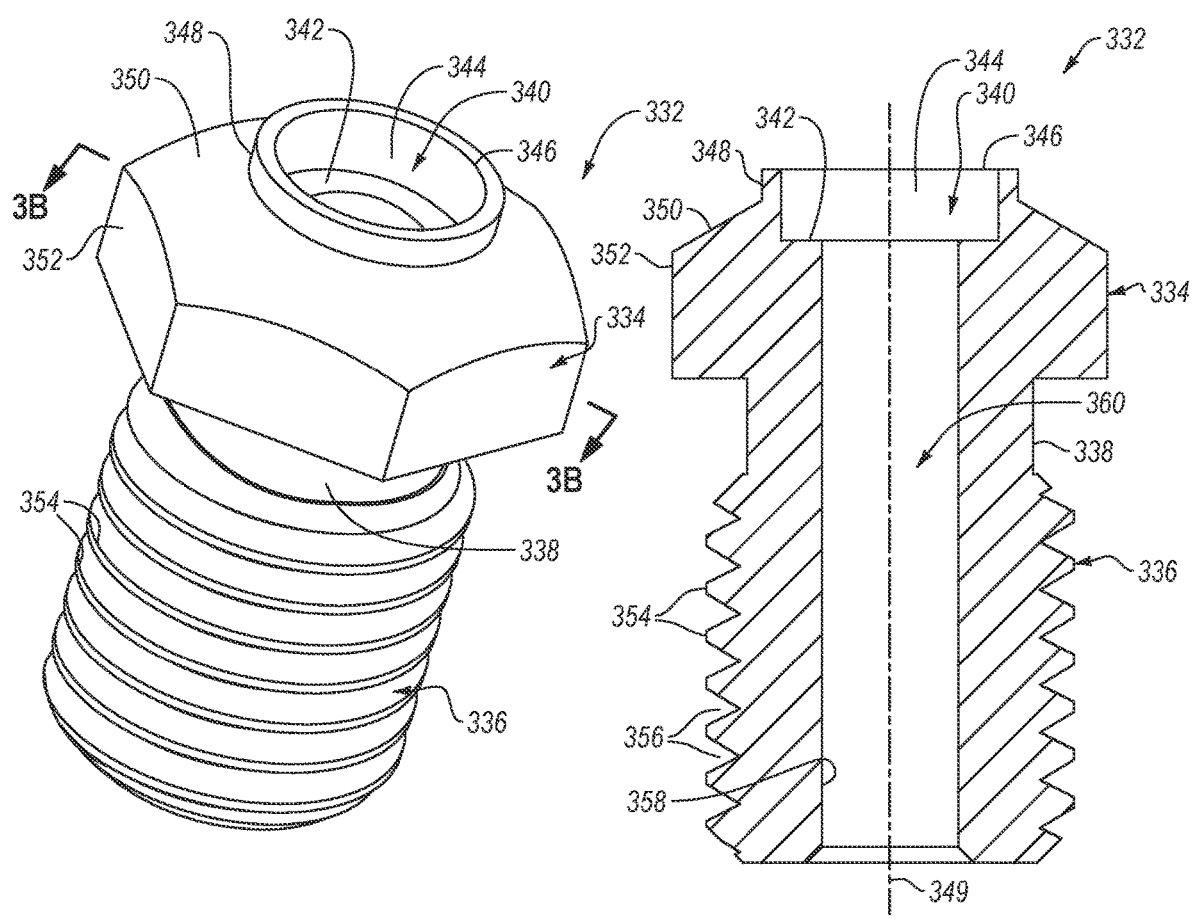
FIG. 3A is an isometric view of a base that is configured to receive any of the nozzles disclosed herein, according to an embodiment.
FIG. 3B is a schematic cross-sectional view of the base taken along plane 3B-3B.

The nozzles disclosed herein may be secured to a base. FIG. 3A is an isometric view of a base 332 that is configured to receive any of the nozzles disclosed herein, according to an embodiment. FIG. 3B is a schematic cross-sectional view of the base 332 taken along plane 3B-3B. The base 332 includes a nozzle portion 334 that is configured to receive a nozzle (not shown) and an attachment portion 336 that is configured to attach the base 332 to a printing device (not shown). The base 332 may optionally include an intermediate portion 338 between the nozzle portion 334 and the attachment portion 336.

Figures 8, 9:
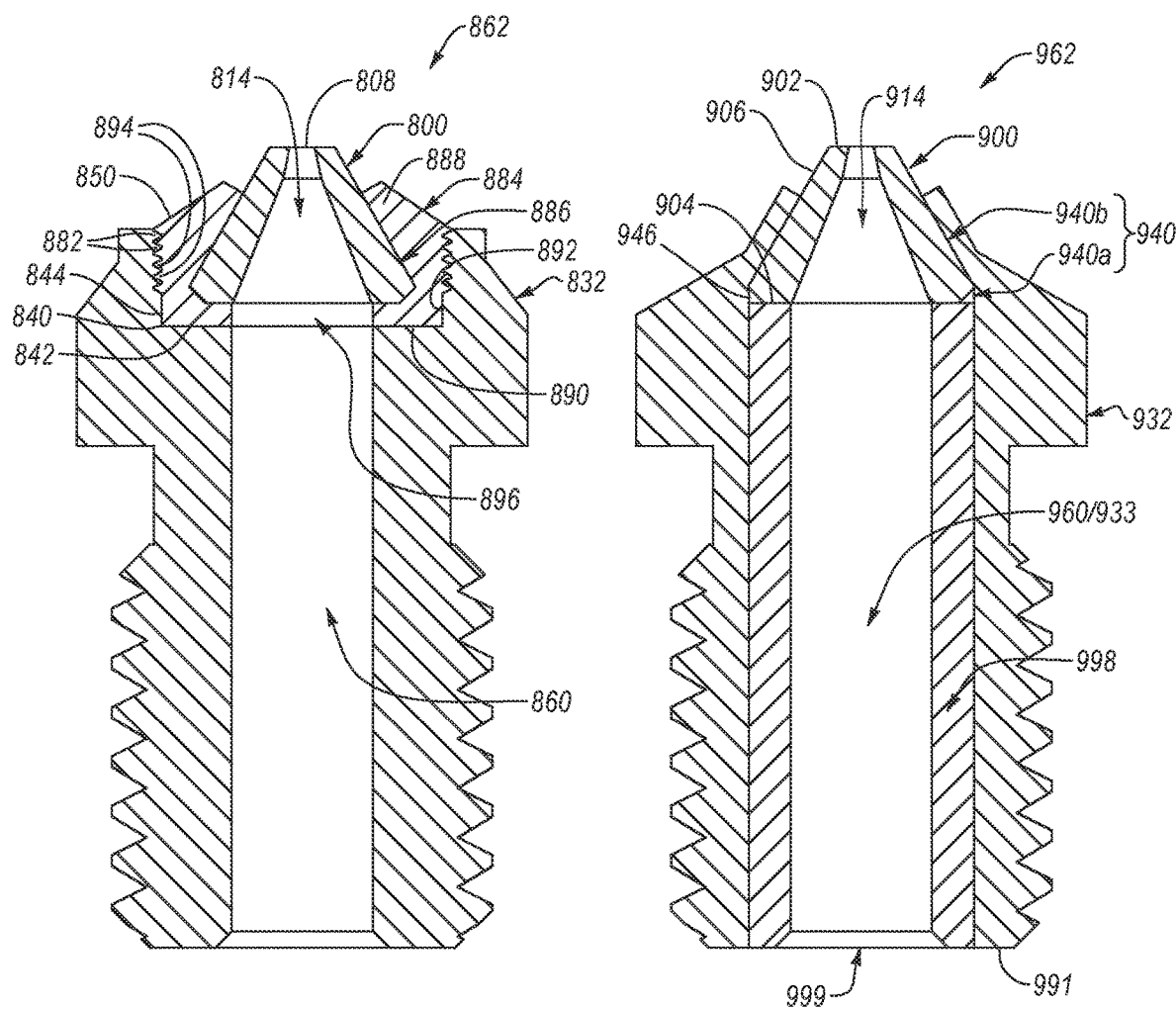
FIG. 8 is a cross-sectional schematic of a nozzle assembly that includes a nozzle threadedly attached to a base, according to an embodiment.
FIG. 9 is a cross-sectional schematic of nozzle assembly that includes a nozzle secured to a base, according to an embodiment.

The nozzle portion 334 of the base 332 defines a recess 340 that is configured to receive a nozzle. The recess 340 is partially defined by a base contact surface 342 that is configured to abut the bottom surface of the nozzle. The base contact surface 342 may exhibit a surface topography that generally corresponds to the surface topography of the bottom surface of the nozzle. The corresponding surface topographies of the base contact surface 342 and the bottom surface may prevent or at least inhibit leakage of a printing material between the nozzle and the base 332. The recess is also partially defined by at least one recess lateral surface 344. The recess lateral surface 344 may define a recess opening 346 that allows the orifice of the nozzle to be exposed to an exterior (e.g., not covered by the base 332) and may allow a portion of the nozzle to extend from the base 332. In other words, the recess lateral surface 344 may be configured to not abut or cover at least a portion (e.g., all) of the top surface of the nozzle. In an embodiment, the recess lateral surface 344 may not exhibit a shape that corresponds to the shape of the nozzle lateral surface of the nozzle when the base is configured to be swaged to the nozzle and the swaging process has not yet occurred. In an embodiment, the recess lateral surface 344 may exhibit a shape that corresponds to the shape of the nozzle lateral surface of the nozzle, such as after swaging the base 332 (as discussed in more detail below) or when the nozzle is secured to the base 332 using a hollowed-sleeve (as illustrated in FIG. 9), thereby preventing or at least inhibiting the printing material from leaking between the recess lateral surface 344 and the nozzle lateral surface of the nozzle. The recess 340 may optionally include at least one chamfer surface (not shown) extending between the base contact surface 342 and the recess lateral surface 344. The chamfer surface may be configured to abut the chamfer of the nozzle if the nozzle includes a chamfer extending between the bottom surface and the nozzle lateral surface of the nozzle.

The nozzle portion 334 may include at least one wall 348 extending from the rest of the nozzle portion 334 (e.g., a tapered surface 350 or gripping feature 352). The wall 348 forms at least a portion of the recess lateral surface 344. The wall 348 is configured to allow the base 332 to secure the nozzle thereto via swaging. For example, the wall 348 may be initially vertical or otherwise oriented such that the lateral dimension the recess opening 346 is wide enough for the nozzle to be correctly positioned in the recess 340 (e.g., the bottom surface of the nozzle abuts the base contact surface 342). In some embodiments, the wall 348 may exhibit a substantially cylindrical geometry. The wall 348 may then be configured to be bent inwardly thereby reducing a lateral dimension of the recess opening 346 such that the lateral dimension of the recess opening 346 is not wide enough for the nozzle to pass through the recess opening 346. Thus, bending the wall 348 inwardly secures the nozzle to the base 332. The wall 348 may also be bent inwardly such that the recess lateral surface 344 abuts the nozzle lateral surface of the nozzle.

The nozzle portion 334 may include a tapered surface 350 extending outwardly from the recess opening 346 and/or the wall 348. The tapered surface 350 may include one or more conical surfaces and/or rounded surfaces. The tapered surface 350 is not perpendicular to a longitudinal axis 349 (e.g., central axis) of the base 332 and instead is angled and/or curved at least slightly towards the attachment portion 336 of the base 332. The tapered surface 350 may prevent or at least decrease the likelihood that the base 332 contacts the printed material than if the base 332 included a non-tapered surface.

The nozzle portion 334 may include one or more gripping features 352 that are configured to facilitate attachment and detachment of the base 332 to a printing device. In an embodiment, the nozzle portion 334 is configured to be threadedly attached to the printing device. In such an embodiment, the gripping features 352 may include a generally square, hexagonal (as shown), or other suitable shape that allows a portion of the nozzle portion 334 to be gripped and twisted with fingers, pliers, wretches, sockets, or other tools. Alternatively, the gripping features 352 may include one or more textured surfaces or a high friction material that also allows the nozzle portion 334 to be gripped with fingers, pliers, or other tools.

As previously discussed, the base 332 includes an attachment portion 336. The attachment portion 336 is configured to attach the base 332 to the printing device. In an embodiment, as illustrated, the attachment portion 336 is configured to be threadedly attached to the printing device. In such an embodiment, the attachment portion 336 may defining one or more helically extending threads 354 and/or one or more helically extending recesses 356. In an embodiment, the attachment portion 336 may include a magnet, a recess configured to receive a pin, be configured to be press-fitted to the printing device, brazed, soldered, adhesively attached, or attached to the printing device using any other suitable technique. In some embodiments, the base 332 may be attached to the printing device using quick-connect coupling mechanisms. In an embodiment, the base 332 may be configured to be reversibly attached to the base 332. In such an embodiment, the base 332 may be attached and detached from the printing device substantially without damaging the base 332 or the printing device. Reversibly attaching the base 332 to the printing device allows the printing device to be used with a variety of nozzle assemblies (e.g., nozzle assemblies with different sized orifices) or to replace worn nozzle assemblies. In an embodiment, the base 332 may be configured to be reversibly attached to the base 332.

The base 332 includes at least one passageway surface 358 that defines a passageway 360. The passageway 360 is configured to extend from the conduit (e.g., an opening of the conduit) of the nozzle to an exterior of the base. The passageway 360 may be in fluid communication a printing material source (e.g., another conduit or tank) of the printing device when the base 332 is attached to the printing device. As such, the printing material from the printing material source may flow from the printing material source, through the passageway 360, and to the conduit of the nozzle. In an embodiment, the passageway 360 is centrally located in the base 332 and extends from the base contact surface 342 to an opposing surface of the attachment portion 336. However, it is noted that the passageway 360 may be non-centrally located, extend from a surface or portion other than the base contact surface, or may define a different pathway depending on the location of the printing material source and/or the location of the opening of the conduit of the nozzle.

As previously discussed, any of the nozzles disclosed herein may be secured to any of the bases disclosed herein via swaging. FIGS. 4A and 4B are schematic cross-sectional views of a nozzle assembly 462 that includes a nozzle 400 and a base 432 before and after swaging, respectively, according to an embodiment. Except as otherwise disclosed herein, the nozzle 400 and the base 432 may include one or more feature that is the same or substantially similar to any one or more feature of the nozzles and bases disclosed herein, respectively, without limitation. Referring to FIG. 4A, a base 432 may be provided that is in an initial, pre-swaging state. The base 432 is in the initial, pre-swaging state when the wall 448 thereof is not bent inwardly (e.g., with the wall 448 extending substantially vertically). After providing the base 432, the nozzle 400 may be disposed in the recess 440 of the base 432 such that the bottom surface 404 of the nozzle 400 abuts the base contact surface 442.

After disposing the nozzle 400 in the recess 440, the base 432 may be swaged, thereby securing the nozzle 400 to the base 432. Swaging the base 432 may include pressing a die against the wall 448. Pressing the die against the wall 448 may press the wall 448 inwardly, thereby decreasing the lateral dimension of the recess opening 446 until the nozzle 400 may not pass through the recess opening 446. The die may also cause the wall 448 to deform inwardly sufficiently such that the recess lateral surface 444 contacts the nozzle lateral surface 406 of the nozzle 400.

FIG. 4B illustrates the nozzle assembly 462 after the base 432 is swaged. As shown, swaging the base 432 secures the nozzle 400 to the base 432 since the decreased lateral dimension of the recess opening 446 (not labeled in FIG. 4B, occupied by nozzle 400) maintains the nozzle 400 within recess 440 (not labeled in FIG. 4B, occupied by nozzle 400) and prevents the nozzle 400 from being displaced relative to the base 432. Further, the swaging the base 432 may press the bottom surface 404 of the nozzle 400 against the base contact surface 442 and/or the recess lateral surface 444 against the nozzle lateral surface of the nozzle 400 thereby preventing printing materials from leaking between such surfaces.

As previously discussed, the top surface 402 of the nozzle 400 may extend a distance d above the base 432. Extending the top surface 402 above the base 432 decreases the likelihood that the base 432 contacts or interferes with the printed material thereby smearing, displacing, or otherwise adversely affecting the printed material. In an embodiment, the distance d may be selected to be greater than about 0.1 mm, greater than about 0.5 mm, greater than about 1 mm, greater than about 1.5 mm, greater than about 2 mm, greater than about 2.5 mm, greater than about 3 mm, greater than about 3.5 mm, greater than about 4 mm, greater than about 5 mm, or in ranges of about 0.1 mm to about 0.5 mm, about 0.25 mm to about 0.75 mm, about 0.5 mm to about 1 mm, about 0.75 mm to about 1.25 mm, about 1 mm to about 1.5 mm, about 1.25 mm to about 1.75 mm, about 1.5 mm to about 2 mm, about 1.75 mm to about 2.25 mm, about 2 mm to about 2.5 mm, about 2.25 mm to about 2.75 mm, about 2.5 mm to about 3 mm, about 2.75 mm to about 3.25 mm, about 3 mm to about 3.5 mm, about 3.25 mm to about 3.75 mm, about 3.5 mm to about 4 mm, about 3.75 mm to about 4.5 mm, or about 4 mm to about 5 mm. In an embodiment, the ratio of the distance d to the maximum length $L_N$ (shown in FIG. 1B), calculated using the equation $d/L_N$, is about 0.1 to about 0.3, about 0.2 to about 0.4, about 0.3 to about 0.5, about 0.4 to about 0.6, about 0.5 to about 0.7, about 0.6 to about 0.8, or about 0.7 to about 0.9. The distance d and the ratio of the distance d to the maximum length $L_N$ may be selected based on the maximum length $L_N$ (shown in FIG. 1B) of the nozzle 400, the percentage of the nozzle lateral surface 406 that is non-vertical, the angle of the non-vertical portions of the nozzle 400 relative to a central axis of the nozzle 400, and the desired accuracy in the shape of the printed material.

Figure 5A:
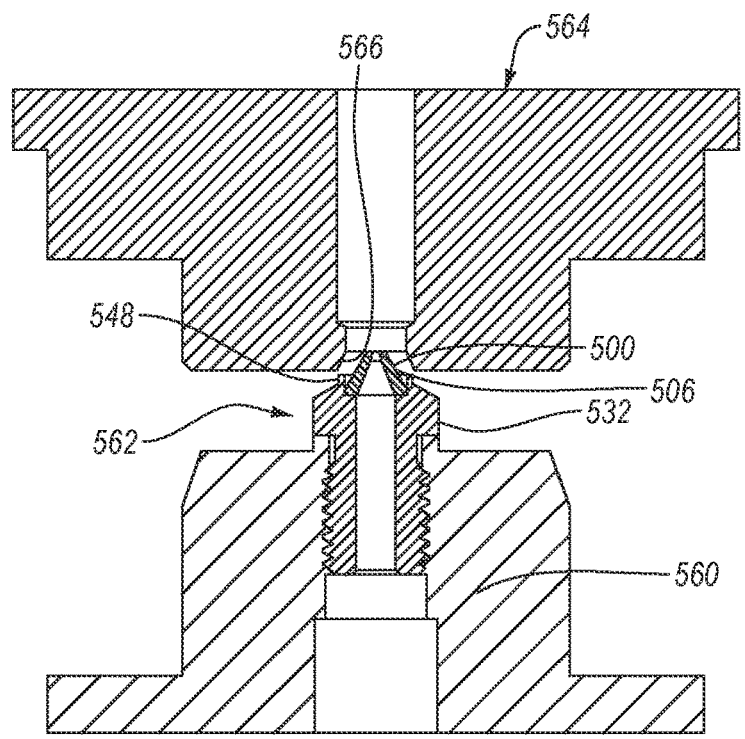
FIGS. 5A and 5B are schematic illustrations of a multiple stage swaging process, according to an embodiment.
Figure 5B:
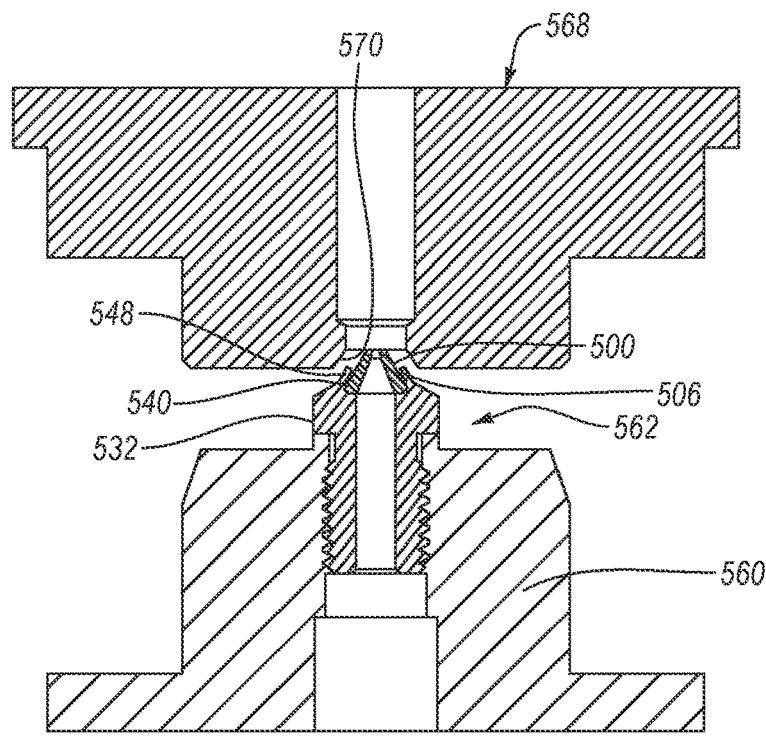

In an embodiment, swaging the base may be performed in a multiple stage swaging process. It is currently believed that a multiple stage swaging process may better secure the nozzle to the base by decreasing the likelihood that the walls of the base fail (e.g., crack) during the swaging process and/or better contact the recess lateral surface against the nozzle lateral surface of the nozzle. FIGS. 5A and 5B are schematic illustrations of a multiple stage swaging process, according to an embodiment. Referring to FIG. 5A, a nozzle assembly 562 is provided that includes a nozzle 500 and a base 532. Except as otherwise disclosed herein, the nozzle 500 and the base 532 may include one or more feature that is the same or substantially similar to any one or more feature of the nozzles and bases disclosed herein, respectively, without limitation. The nozzle assembly 562 may be held by a support 560 that is configured to hold the nozzle assembly 562 and, optionally, press the nozzle assembly 562 into a mold.

The multiple stage swaging process first includes providing a first die 564 and molding the wall 548 with the first die 564. The first die 564 includes one or more first die surfaces 566 that are configured to press against and mold the wall 548 of the base 532. The first die surfaces 566 are relatively vertical (relative to the one or more second die surface 570 of the second die 568). The relatively vertical first die surfaces 566 only bend the wall 548 inwardly a short distance such that the wall 548 exhibits a first tapered shape. The wall 548 may not completely contact the nozzle lateral surfaces 506 of the nozzle 500 when the wall 548 exhibits the first tapered shape. Since the first die surface 566 only bends the wall 548 a short distance inwardly, molding the wall 548 with the first die surface 566 is unlikely to result in failure of the wall 548.

Referring to FIG. 5B, after molding the wall 548 with the first die 564, the multiple stage swaging process includes providing a second die 568 and molding the wall 548 with the second die 568. The second die 568 includes one or more first die surfaces 570 that are configured to press against and mold the wall 548 of the base 532. The second die surfaces 570 are less vertical (e.g., deviate more from being parallel to a central axis of the nozzle 500, central axis 116 shown in FIG. 1B) than the first die surface 566 of the first die 564.

As such, the second die surface 570 bends the wall 548 more inwardly than the first die surface 566 such that the wall 548 exhibits a second tapered shape. The second tapered shape may be less vertical than the first tapered shape. The second die surface 570 may bend the wall 548 sufficiently that, when the wall 548 exhibits the second tapered shape, at least one of the recess lateral surface of the wall 548 contacts at least a portion of the nozzle lateral surface 506 of the nozzle 500 or the nozzle 500 is unable to leave the recess 540. While depicted as a two-stage process with respect to FIGS. 5A and 5B, the swaging process may be conducted in more stages than two, or as indicated above, may take place in a single stage process.

Figure 6:
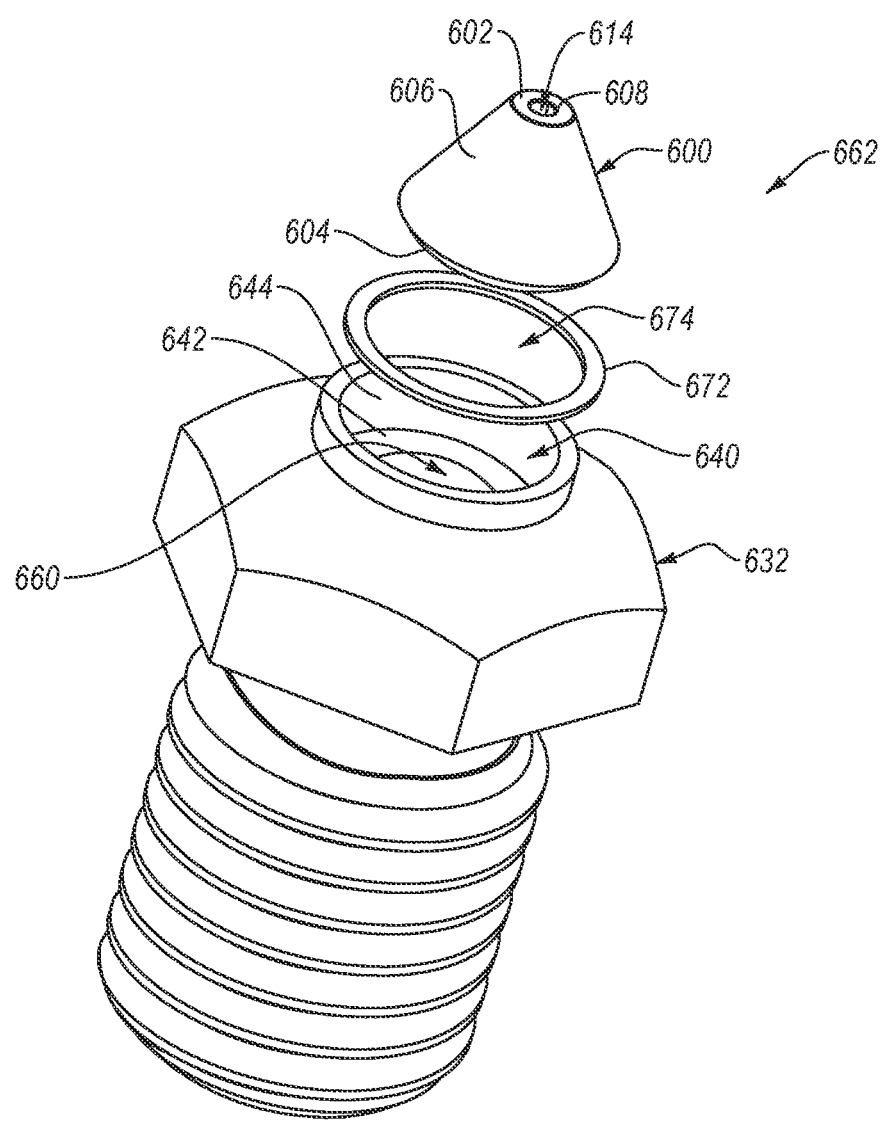
FIG. 6 is an exploded isometric view of a nozzle assembly that includes a leakage feature, according to an embodiment.

The nozzles and nozzle assemblies disclosed herein may include one or more leak prevention features that are configured to prevent or at least inhibit leakage of the printing material between the nozzle and the base. FIG. 6 is an exploded isometric view of a nozzle assembly 662 that includes a leakage feature, according to an embodiment. Except as otherwise disclosed herein, the nozzle assembly 662 may include one or more feature that is the same or substantially similar to any one or more feature of the nozzle assemblies disclosed herein, without limitation. For example, the nozzle assembly 662 may include a nozzle 600 and a base 632 that are similar to any of the nozzles and bases disclosed herein, respectively, in one or more aspects. The base 632 defines a recess 640 that is configured to receive the nozzle 600. In an embodiment, as shown, the base 632 may be configured to have the nozzle 600 secured thereto via swaging. However, it is noted that the nozzle 600 may be secured to the base 632 using any of the attachment techniques disclosed herein.

The nozzle assembly 662 includes at least one malleable material 672 positioned between the nozzle 600 and at least a portion of the base 632. The malleable material 672 is configured to deform (e.g., plastically deform) when the nozzle 600 is secured to the base 632, thereby filling gaps between the nozzle 600 and the base 632. For example, the malleable material 672 may deform during the swaging process to fill in the gaps between the nozzle 600 and the base 632. Filling in the gaps between the nozzle 600 and the base 632 with the malleable material 672 may eliminate, or at least reduce, the number of passageways between the nozzle 600 and the base 632 through which the printing material may flow.

In an embodiment, the malleable material 672 may comprise (or be formed from) a material that is less hard than PCD and PcBN (e.g., a non-superhard material exhibiting a hardness that is less than tungsten carbide) which causes the malleable material 672 to deform more than the PCD and the PcBN of the nozzle 600. In an embodiment, the malleable material 672 may exhibit a hardness that is less than the base 632 which causes the malleable material to deform more than the base 632. In an embodiment, the malleable material 672 may comprise (or be formed from) copper, brass, bronze, aluminum, iron, gold, silver, lead, tin, another suitable metal or metal alloy, an O-ring (e.g., a high temperature O-ring), silicone, another suitable polymer, a material exhibiting a hardness that is less than PCD and PcBN, a non-superhard material (e.g., a material exhibiting a hardness that is less than any other malleable material), or combinations thereof.

In an embodiment, as shown, the malleable material 672 may be configured to be disposed between the bottom surface 604 and the base contact surface 642. As such, the malleable material 672 may be configured to deform and/or at least partially fill any gaps that may form between the bottom surface 604 and the base contact surface 642 thereby preventing or reducing leaks between such surfaces. In an embodiment, the malleable material 672 may define an opening 674. The opening 674 allows the printing material to flow from the passageway 660, through the malleable material 672, and into the conduit 614. In an example, the malleable material 672 may exhibit a generally annular shape (e.g., generally circular or ring-like shape) when the malleable material 672 defines the opening 674.

In an embodiment, not shown, the malleable material 672 may be configured to be disposed between the nozzle lateral surface 606 and the recess lateral surface 644. As such, the malleable material 672 may be configured to deform and/or at least partially fill any gaps that may form between the nozzle lateral surface 606 and the recess lateral surface 644 thereby preventing or reducing leaks between such surfaces. The malleable material 672 may exhibit a shape that generally corresponds to or is similar to the shape of the nozzle lateral surface 606. For example, the malleable material 672 may exhibit a generally truncated hollow conical shape or a generally annular shape. It is noted that the malleable material 672 may exhibit a shape that is different than the shape of the nozzle lateral surface 606 since the malleable material 672 may deform to conform to the shape of the nozzle lateral surface 606. The malleable material 672 may define an opening 674 when the malleable material 672 is positioned between the nozzle and recess lateral surfaces 606, 644 thereby providing (or maintaining) fluid communication between the passageway 660 and the orifice 608 of the nozzle 600.

In an embodiment, a leak prevention feature that is configured to prevent or inhibit the printing material leaking between the nozzle and the base includes one or more protrusion, lips or other surface features (generally referred to as protrusions hereinbelow) extending from the bottom surface and/or nozzle lateral surface of the nozzle. The one or more protrusion may comprise (or be formed from) at least one of PCD, PcBN, or a material that is as hard as or, preferably, harder than the material that forms the base. As such, the one or more protrusion may press into the softer material of the base (or other malleable material—e.g., malleable material 672) thereby forming a seal that prevents or at least inhibits printing material flowing between the nozzle and the base. FIG. 7 is a schematic cross-sectional of a nozzle 700 that include one or more protrusions, according to an embodiment. Except as otherwise disclosed herein, one or more feature of the nozzle 700 may be the same or substantially similar to any one or more feature of the nozzles disclosed herein, without limitation. For example, the nozzle 700 may include a top surface 702, a bottom surface 704, and at least one nozzle lateral surface 706.

The nozzle 700 may include at least one bottom protrusion 776 extending outwardly from the bottom surface 704 of the nozzle 700. For example, the bottom protrusion 776 may extend in a direction that is generally parallel to the central axis 716 of the nozzle 700. The bottom protrusion 776 is configured to press into the base contact surface of the base (not shown) or another adjacent material thereby causing the protrusion to indent or otherwise deform the base or another adjacent material around the bottom protrusion 776. The bottom protrusion 776 may extend at least partially around the opening 710 defined by the bottom surface 704. For example, the bottom protrusion 776 may exhibit an annular or ring-like shape.

The bottom protrusion 776 may exhibit any shape that allows the bottom protrusion 776 to press into the base. In an example, as illustrated, the bottom protrusion 776 may exhibit a generally triangular cross-sectional shape. The wedge-like shape of the generally triangular cross-sectional shape of the bottom protrusion 776 may more easily press the bottom protrusion 776 into the base and deforming the base around the bottom protrusion 776 than other shapes. In an example, the bottom protrusion 776 may exhibit a generally rounded (e.g., semi-circular) cross-sectional shape, a generally rectangular (e.g., square) cross-sectional shape, a generally trapezoidal shape, or any other suitable non-triangular cross-sectional shape. In such an example, the non-triangular cross-sectional shape of the bottom protrusion 776 may be less likely to fail (e.g., crack) when pressed into the base than if the bottom protrusion 776 exhibited the generally triangular cross-sectional shape.

In an embodiment, the bottom protrusion 776 may protrude outwardly (or downwardly in the view shown in FIG. 7) from the bottom surface 704 by a distance D. The distance D may be selected to be about 0.1 mm or greater, about 0.25 mm or greater, about 0.5 mm or greater, about 0.75 mm or greater, about 1 mm or greater, about 1.25 mm or greater, about 1.5 mm or greater, about 1.75 mm or greater, about 2 mm or greater, about 2.5 mm or greater, about 3 mm or greater, about 4 mm or greater, about 5 mm or greater, or in ranges of about 0.1 mm to about 0.5 mm, about 0.25 mm to about 0.75 mm, about 0.5 mm to about 1 mm, about 0.75 mm to about 1.25 mm, about 1 mm to about 1.5 mm, about 1.25 mm to about 1.75 mm, about 1.5 mm to about 2 mm, about 1.75 mm to about 2.5 mm, about 2 mm to about 3 mm, about 2.5 mm to about 4 mm, or about 3 mm to about 5 mm.

In an embodiment, the edges and/or corners of the bottom protrusion 776 may be rounded. Rounding the edges and/or corners of the bottom protrusion 776 may make pressing the bottom protrusion 776 into the base more difficult. However, rounding the edges and/or corners of the bottom protrusion 776 may decrease the likelihood that the bottom protrusion 776 fails when pressing into the base. For example, the bottom protrusion 776 may comprise (or be formed from) PCD, PcBN, or another superhard material. Such materials are likely to be brittle and rounding the edges and/or corners of the bottom protrusion 776 when formed from relatively brittle materials may decrease the likelihood that the bottom protrusion 776 fails. As used herein, the edges and/or corners of the bottom protrusion 776 may be rounded when the edges and/or corners of the bottom protrusion 776 exhibit an average radius of curvature that is about 0.01 mm or greater, about 0.05 mm or greater, about 0.1 mm or greater, about 0.2 mm or greater, about 0.3 mm or greater, about 0.4 mm or greater, about 0.5 mm or greater, about 0.6 mm or greater, about 0.8 mm or greater, about 1 mm or greater, about 1.25 mm or greater, about 1.5 mm or greater, about 2 mm or greater, about 2.5 mm or greater, about 3 mm or greater, or in ranges of about 0.01 mm to about 0.1 mm, about 0.05 mm to about 0.2 mm, about 0.1 mm to about 0.3 mm, about 0.2 mm to about 0.4 mm, about 0.3 mm to about 0.5 mm, about 0.4 mm to about 0.6 mm, about 0.5 mm to about 0.8 mm, about 0.6 mm to about 1 mm, about 0.8 mm to about 1.25 mm, about 1 mm to about 1.5 mm, about 1.25 mm to about 2 mm, about 1.5 mm to about 2.5 mm, or about 2 mm to about 3 mm. The average radius of curvature of the rounded edges and/or corners of the bottom protrusion may be selected based on the distance D that the bottom protrusion 776 extends from the bottom surface 704, the hardness of the material that forms the bottom protrusion 776, and the hardness of the base.

In an embodiment, the nozzle 700 may include at least one lateral protrusion 778 in addition to or instead of the bottom protrusion 776. The lateral protrusion 778 extends outwardly from a portion of the nozzle lateral surface 706 of the nozzle 700. The lateral protrusion 778 is configured to press into a portion of the base (or other adjacent material), such as a portion of the base defining the recess lateral surface. Pressing the lateral protrusion 778 into the base may inhibit the printing material flowing between the nozzle 700 and the base along an undesired pathway.

In an embodiment, the lateral protrusion 778 is the same or substantially similar to the bottom protrusion 776 discussed above except as otherwise disclosed herein. In an example, the lateral protrusion 778 may exhibiting any of the cross-sectional shapes or exhibit any of the rounded edges and/or corners discussed above with regards to the bottom protrusion 776. In an example, the lateral protrusion 778 may extend from the nozzle lateral surface 706 a distance that is the same as any of the distance d discussed above with regards to the bottom protrusion 776.

In an embodiment, the lateral protrusion 778 may exhibit a generally hook-like shape such as shown in FIG. 7. The lateral protrusion 778 may exhibit a generally hook-like shape when the lateral protrusion 778 curves partially towards the top surface 702 (as shown) or otherwise extends from the nozzle lateral surface 706 in a direction that is directed more towards the top surface 702 than the bottom surface 704. The generally hook-like shape of the lateral protrusion 778 may facilitate attachment of the nozzle 700 to the base and may better secure the nozzle 700 to the base when the nozzle 700 and the base are heated. For example, the generally hook-like shape of the lateral protrusion 778 may form a concave portion 780. When swaging the nozzle 700 to a base, a portion of the base may be deformed to at least partially occupy the concave portion 780. During use, a force may be applied to the nozzle 700, for example due to forcing the printing material through the conduit 714, that may push the nozzle 700 generally away from the base. However, the portions of the base that are disposed in the concave portion 780 may prevent the nozzle 700 from being displaced relative to the base. Further, when the nozzle assembly is heated, the portion of the base that abuts the nozzle lateral surface 706 (e.g., the wall) may try to pull away from the nozzle lateral surface 706 due to differences in thermal expansion between the nozzle 700 and the base. When the lateral protrusion 778 curves partially towards the top surface 702, the lateral protrusion 778 may help to counter such forces applied to the nozzle 700 and inhibit separation of the nozzle from the base.

In an embodiment, the lateral protrusion 778 may be configured as a continuous structure or feature that extends about the entirety of the nozzle 700. In other embodiments, the nozzle 700 may include one or many individual, discrete lateral protrusions spaced around the circumference or periphery of the nozzle 700.

In an embodiment, the at least one nozzle lateral surface 706 may include a plurality of nozzle lateral surfaces 706. The plurality of nozzle lateral surfaces 706 may facilitate the formation of the lateral protrusion 778. For example, in the illustrated embodiment, the nozzle lateral surface 706 includes a first surface 706a and a second surface 706b. The first surface 706 extends from or near the top surface 702 to the second surface 706b and the second surface 706b extends from the first surface 706a to the lateral protrusion 778. The first surface 706a may extend at an angle $\phi_1$ relative to the central axis 716 and the second surface 706b may extend at an angle $\phi_2$ relative to the central axis 716. The angle $\phi_2$ may be smaller than the angle $\theta_1$ which may create space for the formation of the lateral protrusion 778 and the concave portion 780. The smaller angle $\phi_2$ may also allow the top surface 702 of the nozzle 700 to protrude further from the base than if the nozzle lateral surface 706 did not include the second surface 706b.

In the embodiments discussed above, the nozzles are mainly discussed as being attached to the base using swaging. However, the nozzles disclosed herein may be attached to the bases using any suitable technique, such as via an adhesive, a threaded attachment, or a hollowed sleeve. FIG. 8 is a cross-sectional schematic of a nozzle assembly 862 that includes a nozzle 800 threadedly attached to a base 832, according to an embodiment. Except as otherwise disclosed herein, one or more feature of the nozzle 800 and/or the base 832 may be the same or substantially similar to any one or more feature of the nozzles and/or bases disclosed herein, respectively, without limitation.

The nozzle 800 is configured to be threadedly attached, either directly or indirectly, to the base 832. Threadedly attaching the nozzle 800 to the base 832 may allow the nozzle 800 to be attached and detached from the base 832, as needed. In an example, the nozzle 800 may be detached from the base 832 when a nozzle 800 with a different sized orifice 808 or other characteristics is desired. In such an example, only a single base 832 is needed to be used with a plurality of different nozzles and/or the base 832 may remain attached to the printing device while the nozzle 800 is changed. In an example, one of the nozzle 800 or the base 832 may be sufficiently worn that the respectively one of the nozzle 800 or the base 832 needs to be replaced. Threadedly attaching the nozzle 800 to the base 832 allows the worn one of the nozzle 800 or the base 832 to be replaced while the other of the nozzle 800 or the base 832 is not replaced. Thus, threadedly attaching the nozzle 800 to the base 832 may decrease the cost of and waste produced by using the nozzle assembly 862.

The base 832 includes a base contact surface 842 and a recess lateral surface 844 that defines a recess 840. The recess lateral surface 844 includes one or more base threads 882 (e.g., one or more helically extending threads 882) formed on at least a portion thereof. The base threads 882 are configured to allow the nozzle 800 to be threadedly attached to the base 832.

In an embodiment, as illustrated in FIG. 8, the nozzle 800 is indirectly attached to the base 832. In such an embodiment, the nozzle assembly 862 includes an intermediate structure 884 that is configured to be attached to the nozzle 800 and threadedly attached to the base 832. As such, the intermediate structure 884 indirectly threadedly attaches the nozzle 800 to the base 832.

The intermediate structure 884 is configured to have the nozzle 800 secured thereto using any suitable technique. In an embodiment, as illustrated, the intermediate structure 884 is configured to have the nozzle 800 secured thereto via swaging. In such an embodiment, the intermediate structure 884 defines a structure recesses 886 that is substantially similar to the recess 340 illustrated in FIGS. 3A and 3B. For example, at least a portion of the surfaces of the intermediate structure 884 that defines the structure recess 886 exhibits a topography that generally corresponds to the surface topography of some of the surfaces of the nozzle 800. The intermediate structure 884 also includes at least one wall 888 that is configured to be bend inwardly. In an embodiment, the nozzle 800 may be attached to the intermediate structure 884 using any other suitable technique, such as via press-fitting, attaching with a high temperature adhesive, threaded attachment, soldering, brazing, or any other suitable technique. In such an embodiment, the intermediate structure 884 may or may not define a structure recess 886 that is configured to receive the nozzle 800.

The intermediate structure 884 includes at least one structure bottom surface 890 and at least one structure lateral surface 892. The structure bottom surface 890 may be configured to abut the base contact surface 842. The surface topographies of the base contact surface 842 and the structure bottom surface 890 may generally correspond with each other such that the printing material may not leak between the base contact surface 842 and the structure bottom surface 890. The structure lateral surface 892 may also exhibit a shape that generally corresponds to the shape of the recess lateral surface 844 to prevent leaks therebetween. At least a portion of the structure lateral surface 892 may also include one or more structure threads 894 that are configured to mate or engage with the base threads 882 thereby allowing the intermediate structure 884 to be threadedly attached to the base 832.

The intermediate structure 884 may define channel 896 extending therethrough (e.g., from an exterior surface to the structure recess 886). The channel 896 may allow the printing material to flow through the intermediate structure 884 such that the printing material may flow from the passageway 860 of the base 832 to the conduit 814 of the nozzle 800. In other words, the channel 896 may enable the conduit 814 to be in fluid communication with the passageway 860.

The intermediate structure 884 may comprise (or be formed from) any suitable material. In an embodiment, the intermediate structure 884 may comprise (or be formed from) brass, bronze, PCD, PcBN, steel, copper, aluminum, or any other suitable material.

In an example, the intermediate structure 884 may include a tapered surface 850 that, similar to the tapered surface 350 illustrated in FIG. 3B, may prevent or at least decrease the likelihood that the intermediate structure 884 contacts the printed material. In an example, the intermediate structure 884 may include a bottom protrusion (not shown) that is configured to press into the base contact surface 842 of the base 832.

In an embodiment, not shown, the nozzle 800 is configured to be directly threadedly attached to the base 832. In such an embodiment, the nozzle 800 may define one or more nozzle threads that are configured to mate or engage with the base threads 882.

FIG. 9 is a cross-sectional schematic of nozzle assembly 962 that includes a nozzle 900 secured to a base 932, according to an embodiment. The nozzle 900 may be secured to the base 932 using a hollowed-sleeve 998 attached to the base 932. Except as otherwise disclosed herein, the nozzle 900 and the base 932 may include one or more feature that is the same or substantially similar to any one or more feature of the nozzles and bases disclosed herein, respectively, without limitation. For example, the nozzle 900 may include a top surface 902, a bottom surface 904, and a nozzle lateral surface 906. The nozzle 900 also defines a conduit 914 or passageway therethrough. The base 932 includes a recess 940 configured to receive the nozzle 900 and a passageway 960.

The recess 940 and the passageway 960 collectively form a bore extending from a recess opening 946 to an opening 999 defined by an exterior surface (e.g., lower surface 991) of the base 932. The passageway 960 exhibits one or more dimensions (e.g., maximum lateral dimension) that allows the nozzle 900 to move therethrough (e.g., before the hollowed-sleeve 998 is attached to the base 932). For example, the dimensions of the passageway 960 may be the same as or larger than the dimensions of the nozzle 900 thereby allowing the nozzle 900 to move within the passageway 960. The recess 940 may include a first portion 940a adjacent to the passageway 960 and a second portion 940b extending from the first portion 940a to the recesses opening 946. The first portion 940a of the recess 940 exhibits one or more dimensions (e.g., maximum lateral dimension) that allows the nozzle 900 to move therethrough. For example, the dimensions of the first portion 940a of the recess 940 may be the same as or larger than the dimensions of the nozzle 900 thereby allowing the nozzle 900 to move therein. In an embodiment, the dimensions of the first portion 940a may be the same or substantially the same as the dimensions of the passageway 960. In such an embodiment, the first portion 940a of the recess 940 is distinguishable from the passageway 960 in that, after assembly (as will be discussed in more detail below), the first portion 940a of the recess 940 is at least partially occupied by the nozzle 900 and is not occupied by the hollowed-sleeve 998 whereas the passageway 960 is at least partially occupied by the hollowed-sleeve 998 and not the nozzle 900. In an embodiment, the first portion 940a of the recess 940 may exhibit dimensions that are slightly smaller than the dimensions of the passageway 960. In such an embodiment, the different dimensions between the first portion 940a and the passageway 960 may create a lip or step which may form a barrier that prevents inserting the hollowed-sleeve 998 into the first portion 940a of the recess 940. At least some of the dimensions of the second portion 940b of the recess 940 decreases from the first portion 940a of the recess 940 to the recess opening 946. The decreased dimensions of the second portion 940b of the recess 940 may prevent the nozzle 900 from moving through the second portion 940b. In other words, the decreased dimensions of the second portion 940b may form a barrier that prevents the nozzle 900 from moving through all of the bore formed by the recess 940 and the passageway 960. In some embodiments, the first portion 940a of the recess 940 may be omitted.

The hollowed-sleeve 998 is configured to be disposed in the passageway 960 and, optionally, secured to the base 932. The hollowed-sleeve 998 is configured to effectively reduce the dimensions of the passageway 960 such that the nozzle 900 cannot move along the passageway 960 after the hollowed-sleeve 998 is positioned in the passageway 960. For example, the hollowed-sleeve 998 may define a channel 933. The channel 933 may provide a fluid flow path such that printing material may flow through the channel 933 to the conduit 914 of the nozzle 900. The channel 933 exhibits one or more dimensions that are sufficiently small that the nozzle 900 cannot move therethrough. Thus, positioning the hollowed-sleeve 998 in the passageway 960 and, optionally, securing the hollowed-sleeve 998 to the base 932 may limit or prevents movement of the nozzle 900 through the passageway 960. Alternatively, the hollowed-sleeve 998 may be trapped in the passageway 960 when the base 932 is secured to the printing device.

In an embodiment, the hollowed-sleeve 998 is configured to be press-fitted to the base 932. In such an embodiment, the hollowed-sleeve 998 may exhibit one or more dimensions that are slightly larger than the dimensions of the passageway 960 of the base 932. The slightly larger dimensions of the hollowed-sleeve 998 may allow the hollowed-sleeve 998 to be press-fitted to the base 932. In an example, insertions of the hollowed-sleeve 998 into the passageway 960 of the base 932 may include heating the base 932 to increase the dimensions of the passageway 960 while the hollowed-sleeve 998 remains cooler than the base 932. The increased dimensions of the passageway 960 may facilitate insertion of the hollowed-sleeve 998 into the passageway 960 while cooling the base 932 after insertion of the hollowed-sleeve 998 into the passageway 960 causes the base 932 to clamp around the hollowed-sleeve 998 and creating an interference fit between the two components. In an embodiment, the hollowed-sleeve 998 may be attached to the base 932 using a technique other than press-fitting. For example, the hollowed-sleeve 998 may be brazed, welded, or soldered to the base 932. In such an example, the hollowed-sleeve 998 may exhibit dimensions that are slightly smaller than the dimensions of the passageway 960 thereby allowing the hollowed-sleeve 998 to be easily positioned in the passageway 960.

During assembly, the hollowed-sleeve 998 is either spaced from the passageway 960 or, if the hollowed-sleeve 998 is provided in the passageway 960, the hollowed-sleeve 998 is removed from the passageway 960. With the hollowed-sleeve 998 outside of the passageway 960, the nozzle 900 may be inserted into the passageway 960 through the opening 999. The nozzle 900 may then move through the passageway 960 until the nozzle 900 is in the recess 940. For example, the nozzle 900 may be inserted until the second portion 940b of the recess 940 prevents the nozzle 900 from moving further through the passageway 960. After positioning the nozzle 900 in the recess 940, the hollowed-sleeve 998 may be positioned in the passageway 960. For example, the hollowed-sleeve 998 may be positioned such that the hollowed-sleeve 998 is adjacent to the recess 940 and contacts the nozzle 900 thereby preventing or at least inhibiting movement of the nozzle 900 in the recess 940. Optionally, the hollowed-sleeve 998 may then be secured to the base 932 using any of the techniques disclosed herein thereby securing the nozzle 900 to the base 932.

While various aspects and embodiments have been disclosed herein, other aspects and embodiments are contemplated. The various aspects and embodiments disclosed herein are for purposes of illustration and are not intended to be limiting.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A nozzle assembly for three-dimensional printing, the nozzle assembly comprising:
    a base defining a recess and a passageway extending from the recess to an exterior of the base; and
    a nozzle disposed in the recess, wherein the nozzle is a unitary sintered structure, the nozzle comprising:
        at least one top surface defining an orifice configured for dispensing printing material out of the nozzle assembly;
        at least one bottom surface opposite the at least one top surface, the at least one bottom surface defining an opening;
        at least one lateral surface extending from or near the at least one top surface to or near the at least one bottom surface; and at least one conduit surface defining a conduit, the at least one conduit surface extending from the orifice to the opening, at least a portion of the at least one conduit surface comprising at least one of polycrystalline diamond or polycrystalline cubic boron nitride, the conduit of the nozzle in fluid communication with the passageway when the nozzle is disposed in the recess;

wherein an outer surface of the nozzle is secured to the base in a fixed manner at least partially within the recess by a portion of the base extending over a portion of the at least one lateral surface of the nozzle; and wherein the nozzle includes at least one lateral protrusion extending from the at least one lateral surface.

2. The nozzle assembly of claim 1, wherein a portion of the nozzle separate from the at least one conduit surface includes the polycrystalline diamond.

3. The nozzle assembly of claim 1, wherein the nozzle includes at least one bottom protrusion extending from the at least one bottom surface.

4. The nozzle assembly of claim 1, wherein the nozzle is secured to the base by a plastically deformed portion of the base.

5. The nozzle assembly of, wherein the at least one lateral protrusion defines a hook shape curved toward the at least one top surface.

6. The nozzle assembly of claim 1, wherein the nozzle is secured to the recess by swaging.

7. The nozzle assembly of claim 1, wherein the base comprises an intermediate body attached to the nozzle, the intermediate body configured to be directly threadedly attached to another portion of the base.

8. The nozzle assembly of claim 1, wherein the nozzle is further secured to the recess by press-fitting a hollowed-sleeve into the passageway.

9. The nozzle assembly of claim 8, wherein the passageway exhibits a dimension that is sufficiently large that the nozzle does not substantially move in the passageway and the hollowed sleeve defines a channel exhibiting a dimension that is sufficiently small that the nozzle cannot move therethrough.

10. The nozzle assembly of claim 1, wherein the at least one top surface extends from the base by a distance, a ratio of the distance that the at least one top surface extends from the base to a maximum length of the nozzle is about 0.5 to about 0.9.

11. A nozzle for three-dimensional printing, the nozzle comprising:
at least one top surface defining an orifice;
at least one bottom surface opposite the at least one top surface, the at least one bottom surface defining an opening;
at least one lateral surface extending from or near the at least one top surface to or near the at least one bottom surface;
at least one conduit surface defining a conduit, the at least one conduit surface extending from the orifice to the opening, at least a portion of the at least one conduit surface comprising at least one of polycrystalline diamond or polycrystalline cubic boron nitride; and
at least one protrusion extending from at least one of the at least one bottom surface or the at least one lateral surface, at least a portion of the at least one protrusion being formed from a superhard material, the superhard material of the at least a portion of the at least one protrusion being configured to at least partially plastically deform a material of a base on which the nozzle is received in order to at least partially form at least one sealing feature between the nozzle and the base and to fixedly secure the nozzle to the base.

12. The nozzle of claim 11, wherein the at least one protrusion defines an annular protrusion.

13. The nozzle of claim 11, wherein the at least one protrusion extends from the at least one bottom surface to define the at least one sealing feature.

14. The nozzle of claim 13, wherein the at least one protrusion extends from the at least one lateral surface to define the at least one sealing feature.

15. The nozzle of claim 13, wherein the at least one protrusion forms a hook shape curved towards the at least one top surface.

16. The nozzle of claim 11, wherein the superhard material comprises at least one of polycrystalline diamond or polycrystalline cubic boron nitride.

17. A method of attaching a nozzle to a base to form a nozzle assembly for three-dimensional printing, the method comprising:
providing the base defining a recess and a passageway extending from the recess to an exterior of the base, the base including at least one wall extending from the rest of the base, the at least one wall defining a portion of the recess;
disposing the nozzle of claim 11 in the recess; and
deforming the at least one wall of the base, wherein the deforming attaches the nozzle to the base.

18. A nozzle assembly for three-dimensional printing, the nozzle assembly comprising:
a base defining a recess and a passageway extending from the recess to an exterior of the base; and
a nozzle disposed in the recess, wherein the nozzle is a unitary sintered structure, the nozzle comprising:
at least one top surface defining an orifice configured for dispensing printing material out of the nozzle assembly;
at least one bottom surface opposite the at least one top surface, the at least one bottom surface defining an opening;
at least one lateral surface extending from or near the at least one top surface to or near the at least one bottom surface; and
at least one conduit surface defining a conduit, the at least one conduit surface extending from the orifice to the opening, at least a portion of the at least one conduit surface comprising at least one of polycrystalline diamond or polycrystalline cubic boron nitride, the conduit of the nozzle in fluid communication with the passageway when the nozzle is disposed in the recess;
wherein the nozzle is directly secured to the base and at least partially within the recess by a plastically deformed portion of the base extending over a portion of the at least one lateral surface of the nozzle.

19. The nozzle assembly of claim 18, wherein the nozzle is directly secured to the base at an additional outer surface of the nozzle.

20. The nozzle assembly of claim 18, wherein the nozzle comprises at least one protrusion extending from nozzle, at least a portion of the at least one protrusion being formed from a superhard material, the superhard material of the at least a portion of the at least one protrusion configured to at least partially plastically deform a material of a base on which the nozzle is received in order to at least partially form at least one sealing feature between the nozzle and the base.

21. A nozzle assembly for three-dimensional printing, the nozzle assembly comprising:
- a nozzle secured to a base in a fixed manner;
- wherein the nozzle comprises:
- at least one top surface defining an orifice;
- at least one bottom surface opposite the at least one top surface, the at least one bottom surface defining an opening;
- at least one lateral surface extending from or near the at least one top surface to or near the at least one bottom surface;
- at least one conduit surface defining a conduit, the at least one conduit surface extending from the orifice to the opening, at least a portion of the at least one conduit surface comprising at least one of polycrystalline diamond or polycrystalline cubic boron nitride; and
- at least one protrusion extending from at least one of the at least one bottom surface or the at least one lateral surface, at least a portion of the at least one protrusion being formed from a superhard material, wherein the material of the base adjacent to the at least one protrusion is at least partially deformed;
- wherein the nozzle is attached to the base such that at least one sealing feature is at least partially formed between the nozzle and the base.

* * * * *